(12) United States Patent
Prokop et al.

(10) Patent No.: US 12,517,041 B2
(45) Date of Patent: Jan. 6, 2026

(54) MULTI SINGLE DETECTOR APPLICATION SPECIFIC SPECTROMETER

(71) Applicant: TRINAMIX GMBH, Ludwigshafen am Rhein (DE)

(72) Inventors: Christoph Prokop, Ludwigshafen am Rhein (DE); Celal Mohan Oeguen, Ludwigshafen am Rhein (DE); Sourabh Kulkarni, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 114 days.

(21) Appl. No.: 18/692,859

(22) PCT Filed: Sep. 30, 2022

(86) PCT No.: PCT/EP2022/077328
§ 371 (c)(1),
(2) Date: Mar. 18, 2024

(87) PCT Pub. No.: WO2023/052608
PCT Pub. Date: Apr. 6, 2023

(65) Prior Publication Data
US 2024/0377315 A1 Nov. 14, 2024

(30) Foreign Application Priority Data

Oct. 1, 2021 (EP) .................................. 21200549

(51) Int. Cl.
*G01N 21/31* (2006.01)
(52) U.S. Cl.
CPC ..... *G01N 21/31* (2013.01); *G01N 2201/0221* (2013.01)
(58) Field of Classification Search
CPC .................. G01N 21/31; G01N 2201/0221
See application file for complete search history.

(56) References Cited

U.S. PATENT DOCUMENTS

| 10,241,095 B2 | 3/2019 | Coates |
| 2015/0335248 A1* | 11/2015 | Huang ................. A61B 5/0084 702/19 |
| 2023/0417657 A1 | 12/2023 | Oeguen et al. |

FOREIGN PATENT DOCUMENTS

| CN | 108226059 A | 6/2018 |
| DE | 102013105284 A1 | 11/2014 |
| EP | 3136270 A1 | 3/2017 |

OTHER PUBLICATIONS

Breiman, "Random Forests", Machine Learning, vol. 45, pp. 5-32 (2001).

(Continued)

*Primary Examiner* — Jamil Ahmed
(74) *Attorney, Agent, or Firm* — Armstrong Teasdale LLP

(57) ABSTRACT

Disclosed herein is a spectral measurement device for measuring optical radiation provided by at least one measurement object in at least one classification based spectral measurement. The spectral measurement device includes:
  at least one radiation source configured for emitting optical radiation at least partially towards the measurement object;
  at least two photodetectors, wherein each photodetector includes at least one pixel;
  at least one read-out device configured for measuring the photodetector signals and generating at least one item of spectral data; and
  at least one evaluation device comprising at least one processor and at least one memory storage.
The evaluation device is configured for generating at least one item of measurement information by applying the classification model and the transfer function to the item of spectral data.

18 Claims, 6 Drawing Sheets

(56) References Cited

OTHER PUBLICATIONS

Hartigan et al., "A K-Means Clustering Algorithm", Journal of the Royal Statistical Society, Series C (Applied Statistics), vol. 28, pp. 100-108 (1979).
International Search Report and Written Opinion for corresponding PCT/EP22/77328 mailed Dec. 5, 2022, 9 pages.

* cited by examiner

MULTI SINGLE DETECTOR APPLICATION SPECIFIC SPECTROMETER

CROSS-REFERENCE TO RELATED APPLICATIONS

This application is a U.S. National Phase Application of International Patent Application No. PCT/EP22/77328, filed Sep. 30, 2022, which claims priority to EP Patent Application No. 21200549.0 filed Oct. 1, 2021, and each of which is hereby incorporated by reference herein.

TECHNICAL FIELD

The invention relates to a spectral measurement device for measuring optical radiation in at least one classification based spectral measurement, a method for measuring optical radiation by performing a classification based spectral measurement and various uses of the spectral measurement device. Such devices and methods can, in general, be employed for various applications. As an example, such devices and methods can be used for investigation or monitoring purposes, in particular for infrared detection, heat detection, flame detection, fire detection, smoke detection, pollution monitoring, monitoring of an industrial process, a chemical process, a food processing process, a sorting process such as plastic sorting or textile sorting or the like. However, further kinds of applications are also possible.

BACKGROUND ART

In order to measure the interaction between any material and energy, e.g. electromagnetic radiation, spectrometers are employed. For the qualitative application, e.g. the classification of different samples, the data may be sent to a processing unit, e.g. a computer, where mathematical calculations are performed on the spectral data. However, the need to evaluate the spectral data on another device reduces the capability of the spectrometers for consumer use. Further, particularly miniaturized reflectance spectrometers tend to be rather expensive for consumer use.

There are relatively cheap miniaturized spectrometry solutions based on microelectromechanical systems (MEMS) such as presented by Spectral Engines GmbH. However, those are limited to certain specific wavelength range, for example 1550 nm to 1950 nm in case of the product Nirone Sensor S. This technological limitation highly limits their use in applications, where distinct wavelength regions are to be measured. Moreover, the moving MEMS part means added variances to the system performance. Mechanical movements such as vibrations may distort the measurement results. This makes the use of such miniaturized spectrometry solutions in consumer products or industrial applications unfavorable. Further spectrometer systems such as SCiO™ by Consumer Physics, Inc. have discrete wavelength filters, while the photosensitive detector is a CMOS imager and its wavelength range is very limited to only a fraction of the near infrared range from 740 nm to 1070 nm. Moreover, due to the drifts of photosensitive detectors, all such spectrometer systems may need calibration via human interaction which does not allow easy use. These disadvantages limit the application of a qualitative analysis in consumer applications such as in smartphones or smart household devices such as vacuum robots or washing machines. Thus, miniaturization of spectrometers may allow increased use in industrial applications. However, as indicated, miniaturized spectrometers are still not finding a foothold in consumer applications due to their relatively high costs, complexity in data interpretation and the difficulty to integrate them in such consumer applications. For instance, SCiO™ by Consumer Physics, Inc. and LinkSquare by Stratio, Inc. provide micro-sized handheld spectrometers for consumer applications but still require interaction by a trained user for data interpretation, since the data output from the system is in form of a spectrum.

EP 3 136 270 A1 discloses a device for receiving information identifying results of a spectroscopic measurement of an unknown sample. The device may perform a first classification of the unknown sample based on the results of the spectroscopic measurement and a global classification model. The device may generate a local classification model based on the first classification. The device may perform a second classification of the unknown sample based on the results of the spectroscopic measurement and the local classification model. The device may provide information identifying a class associated with the unknown sample based on performing the second classification. However, the devices proposed in this document are not miniaturized and thus less suitable for consumer applications.

U.S. Pat. No. 10,241,095 B2 discloses a series of optical spectral sensors for gas and vapor measurements using a combination of solid-state light sources (LED or Broadband) and multi-element detectors, housed within an integrated package that includes the interfacing optics and acquisition and processing electronics. Spectral selectivity is provided by a custom detector. The multicomponent gas monitor system has no moving parts and the gas sample flows through a measurement chamber where it interacts with a light beam created from the light source, such as a MEMS broad band IR source or a matrix of LEDs. A custom detector(s) is/are configured with multi-wavelength detection to detect and measure the light beam as it passes through the sample within the measurement chamber. However, the devices proposed in this document perform no classification of samples which reduces information content for consumers.

PROBLEM TO BE SOLVED

It is therefore desirable to provide devices and methods facing the above-mentioned technical challenges of known devices and methods. Specifically, it is an object of the present invention to provide reliable, low cost and consumer friendly devices and methods for performing spectroscopic measurements with an integrated data analysis.

SUMMARY

This problem is addressed by the invention with the features of the independent claims. Advantageous embodiments which might be realized in an isolated fashion or in any arbitrary combinations are listed in the dependent claims as well as throughout the specification.

In a first aspect of the present invention, a spectral measurement device for measuring optical radiation provided by at least one measurement object in at least one classification based spectral measurement is disclosed. The term "spectral" including any grammatical variation thereof, as used herein is a broad term and is to be given its ordinary and customary meaning to a person of ordinary skill in the art and is not to be limited to a special or customized meaning. The term specifically may refer, without limitation, to a partition of the optical wavelength range. A spectrum may be constituted by an optical signal defined by a signal wavelength and a corresponding signal intensity. Specifically, the spectrum may comprise spectral information relating to the measurement object, e.g. to a type and/or a composition of at least one material forming the measurement object, which can be determined by recording at least one spectrum related to the measurement object.

Consequently, the term "spectral measurement device", as used herein is a broad term and is to be given its ordinary and customary meaning to a person of ordinary skill in the art and is not to be limited to a special or customized meaning. The term specifically may refer, without limitation, to an arbitrary apparatus which is configured for determining spectral information by recording at least one measured value for at least one signal intensity related to at least one corresponding signal wavelength of optical radiation and by evaluating at least one detector signal which relates to the signal intensity. Specifically, the spectral measurement device may be, may comprise or may be part of at least one miniaturized apparatus. For example, the spectral measurement device may be, may comprise or may be part of at least one handheld apparatus. The term "handheld" as used herein is a broad term and is to be given its ordinary and customary meaning to a person of ordinary skill in the art and is not to be limited to a special or customized meaning. The term specifically may refer, without limitation, to an arbitrary portable apparatus. The handheld apparatus may specifically be configured, by its dimensions and/or its weight, for being carried by a user with a single hand. Thus, as an example, a volume of the handheld apparatus may not exceed 0.001 m$^3$, and/or the weight of the handheld apparatus may not exceed 1 kg. Specifically, the spectral measurement device may be, may comprise or may be part of at least one wearable device, specifically a smartphone or a smartwatch. The fact that the spectral measurement device may be, may comprise of may be part of a miniaturized apparatus such as a handheld apparatus may specifically facilitate a consumer friendly application of the spectral measurement device. Further, the spectral measurement device may comprise at least one housing. The housing may be configured for protecting and/or shielding parts inside the housing against environmental influences such as mechanical influences or electromagnetic influences.

The term "optical radiation" as used herein is a broad term and is to be given its ordinary and customary meaning to a person of ordinary skill in the art and is not to be limited to a special or customized meaning. The term specifically may refer, without limitation, to electromagnetic radiation in one or more of the visible spectral range, the ultraviolet spectral range and the infrared spectral range. The term "ultraviolet spectral range", as used herein is a broad term and is to be given its ordinary and customary meaning to a person of ordinary skill in the art and is not to be limited to a special or customized meaning. The term specifically may refer, without limitation, to electromagnetic radiation having a wavelength of 1 nm to 380 nm, preferably of 100 nm to 380 nm. Further, in partial accordance with standard ISO-21348 in a valid version at the date of this document, the term "visible spectral range", as used herein is a broad term and is to be given its ordinary and customary meaning to a person of ordinary skill in the art and is not to be limited to a special or customized meaning. The term specifically may refer, without limitation, to a spectral range of 380 nm to 760 nm. Further, the term "infrared spectral range" is a broad term and is to be given its ordinary and customary meaning to a person of ordinary skill in the art and is not to be limited to a special or customized meaning. The term specifically may refer, without limitation, to electromagnetic radiation in the range of 760 nm to 1000 µm, wherein the range of 760 nm to 1.5 µm is usually denominated as "near infrared spectral range" (NIR) while the range from 1.5µ to 15 µm is denoted as "mid infrared spectral range" (MidIR) and the range from 15 µm to 1000 µm as "far infrared spectral range" (FIR). Preferably, the optical radiation used for the typical purposes of the present invention is optical radiation in the infrared (IR) spectral range, more preferred, in the near infrared (NIR) and the mid infrared spectral range (MidIR), especially the optical radiation having a wavelength of 1 µm to 5 µm, preferably of 1 µm to 3 µm.

As said, the optical radiation is provided by at least one measurement object. In this context, the term "providing" including any grammatical variations thereof as used herein is a broad term and is to be given its ordinary and customary meaning to a person of ordinary skill in the art and is not to be limited to a special or customized meaning. The term specifically may refer, without limitation, to at least one of reflecting, specifically diffusely; diffracting; transmitting and emitting optical radiation. The optical radiation provided by the measurement object may be indicative of at least one of a physical property of the measurement object, e.g. an optical property and/or a temperature of the measurement object, and a chemical property of the measurement object, e.g. a chemical composition of the measurement object. As an example, the optical radiation provided by the measurement object may be emitted by the measurement object, specifically at least partially towards the spectral measurement device. Further, the optical radiation provided by the measurement object may be reflected by the measurement object at least partially towards the spectral measurement device, specifically diffusely. Further, the optical radiation provided by the measurement object may be transmitted through the measurement object at least partially towards the spectral measurement device. However, the measurement object may also at least partially absorb the optical radiation, which may specifically be indicative of at least one physical property of the measurement object and/or at least one chemical property of the measurement object such as a chemical composition of at least one material forming the measurement object.

The term "measurement object" as used herein is a broad term and is to be given its ordinary and customary meaning to a person of ordinary skill in the art and is not to be limited to a special or customized meaning. The term specifically may refer, without limitation, to an arbitrary body, chosen from a living body and a non-living body. The measurement object may specifically comprise at least one material which is subject to an investigation by the spectral measurement device. The measurement object may generally refer to an object which is to be measured, e.g. for which a spectrum is to be recorded, wherein the object has in principle arbitrary properties, e.g. arbitrary optical properties or an arbitrary shape. The measurement object may specifically comprise at least one solid sample. However, other measurement objects such as fluids may also be feasible.

As said, the spectral measurement device is configured for measuring the optical radiation in at least one classification based spectral measurement. The term "class" as used herein is a broad term and is to be given its ordinary and customary meaning to a person of ordinary skill in the art and is not to be limited to a special or customized meaning. The term specifically may refer, without limitation, to a group of entities, e.g. objects or elements, sharing at least one property. The shared property may refer to a physical property, specifically an optical property such as a spectral characteristic of an object or element. The shared property may further refer to a chemical property such as a chemical composition of an object. As an example, a shared property of a plurality of objects may be a common material they all contain. Specifically, each class may refer to at least one material having at least one distinct spectral characteristic or to at least one group of materials having similar spectral characteristics. The spectral characteristic may specifically comprise at least one absorption peak of the material and/or a physical quantity associated with the absorption peak. More specifically, the material may be at least one material selected from the group consisting of: synthetic textile; cotton; wool; silk; Polyethylene terephthalate (PET); Polypropylene (PP); Polyethylene (PE); Polyvinyl chloride (PVC); high-density Polyethylene (HDPE); low density Polyethylene (LDPE); Polyamide (PA); glass. Generally, the term category may also be used synonymously for the term class.

Consequently, the term "classification" including any grammatical variations thereof as used herein is a broad term and is to be given its ordinary and customary meaning to a person of ordinary skill in the art and is not to be limited to a special or customized meaning. The term specifically may refer, without limitation, to grouping entities with shared properties within respective classes. Specifically, a plurality of entities with at least one shared property may be grouped within one class. The classification may first of all comprise analyzing the entities and identifying the shared properties. As an example, the classification may specifically refer to analyzing a chemical composition of objects and grouping objects comprising a common material in one class. The classification may also refer to generating and/or defining classes, specifically to defining class boundaries. As an example, the classification may set at least one limit for a physical property as a class boundary such as at least one of a density; a concentration and a thickness. As a further example, the classification may set at least one maximum deviation from a predetermined condition or status as a class boundary. For instance, measurement objects mainly consisting of one material except for a predetermined deviating portion may be grouped in one class. Thus, the class may specifically be defined by the material. The classification may comprise assigning entities to at least one class. In principle, it may be possible to simultaneously assign an entity to a plurality of classes. Thus, given a defined class, at least one entity may be assigned to it, specifically in case the entity shares at least one property with further entities the class already comprises or in case it the entity lies within defined class boundaries. As an example, a class may be defined by a material. Then, a measurement object may be assigned to the class or category in the case the measurement object comprises the material, at least to a predetermined extent, which may for instance be determined by measuring at least one physical property of the object such as an optical property, e.g. an absorption.

The term "classification based spectral measurement" as used herein is a broad term and is to be given its ordinary and customary meaning to a person of ordinary skill in the art and is not to be limited to a special or customized meaning. The term specifically may refer, without limitation, to a spectral measurement, wherein measured spectral data and/or preprocessed measured spectral data is subsequently classified. A result or an interim result of the classification based spectral measurement may specifically comprise information about a class which the measurement object can be assigned to.

The spectral measurement device comprises:
at least one radiation source configured for emitting optical radiation at least partially towards the measurement object, wherein the optical radiation is at least partially in the spectral range of interest for the classification based spectral measurement;
at least two photodetectors, wherein each photodetector comprises at least one pixel, wherein each pixel is an active pixel or a darkened pixel, wherein the spectral measurement device comprises at least two active pixels, wherein the spectral measurement device comprises at least one darkened pixel, wherein each active pixel is configured for generating at least one photodetector signal dependent on an illumination of the active pixel, wherein at least two of the active pixels are configured for detecting optical radiation in at least partially different spectral ranges, wherein each darkened pixel is configured for generating at least one photodetector signal independent on an illumination of the darkened pixel;
at least one read-out device configured for measuring the photodetector signals and generating at least one item of spectral data; and
at least one evaluation device comprising at least one processor and at least one memory storage, wherein the memory storage is configured for storing
at least one classification model comprising a set of different classes, wherein each class refers to at least one spectral characteristic, wherein the classification model is configured for classifying at least one item of input data into the classes; and
at least one transfer function configured for transferring the item of spectral data into the item of input data applicable to the classification model.

The evaluation device is configured for generating at least one item of measurement information by applying the classification model and the transfer function to the item of spectral data.

The term "radiation source" as used herein is a broad term and is to be given its ordinary and customary meaning to a person of ordinary skill in the art and is not to be limited to a special or customized meaning. The term specifically may refer, without limitation, to an in principle arbitrary device configured for emitting optical radiation. The term "emitting" including any grammatical variations thereof as used herein is a broad term and is to be given its ordinary and customary meaning to a person of ordinary skill in the art and is not to be limited to a special or customized meaning. The term specifically may refer, without limitation, to an arbitrary process of generating and sending out optical radiation. The radiation source may comprise at least one of a semiconductor-based radiation source and a thermal radiator. The semiconductor-based radiation source may be selected from at least one of a light emitting diode (LED) or a laser, specifically a laser diode. The thermal radiator may comprise at least one incandescent lamp.

The radiation source may be modulated. The term "modulating" including any grammatical variation thereof is a broad term and is to be given its ordinary and customary meaning to a person of ordinary skill in the art and is not limited to a special or customized meaning. The term specifically may refer, without limitation, to the process of changing, specifically periodically changing, at least one property of optical radiation, specifically one or both of an intensity or a phase of the optical radiation. The modulation may be a full modulation from a maximum value to zero, or may be a partial modulation, from a maximum value to an intermediate value greater than zero. The radiation source may be modulated electrically and/or mechanically and/or electromechanically. As an example, the radiation source may be modulated by using at least one chopper.

The term "spectral range of interest for the classification based spectral measurement" as used herein is a broad term and is to be given its ordinary and customary meaning to a person of ordinary skill in the art and is not to be limited to a special or customized meaning. The term specifically may refer, without limitation, to a spectral range suited for measuring at least one optical property of the measurement object which can directly or indirectly be used for classifying the measurement object. As an example, within the spectral range, the measurement object may show at least one optical property which is specific for a material such as a spectral characteristic, e.g. an absorption peak, wherein the optical property can be used for assigning the measurement object to a class defined by the material.

The term "photodetector" as used herein is a broad term and is to be given its ordinary and customary meaning to a person of ordinary skill in the art and is not to be limited to a special or customized meaning. The term specifically may refer, without limitation, to an optical sensor configured for detecting optical radiation, such as for detecting an illumination and/or a light spot generated by at least one light beam. The photodetector may comprise at least one substrate. A single photodetector may be a substrate with at least one single photosensitive area, which generates a physical response to the illumination for a given wavelength range. As said, each photodetector comprises at least one pixel. The term "pixel" as used herein is a broad term and is to be given its ordinary and customary meaning to a person of ordinary skill in the art and is not to be limited to a special or customized meaning. The term specifically may refer, without limitation, to a unit of a photosensitive area of the photodetector. The pixel may be illuminated by the optical radiation and may generate in response to the illumination at least one photodetector signal. The photodetector signal may comprise any signal generated by the photodetector. The pixel may be located on a surface of the photodetector, specifically on the substrate. Further, the pixel may specifically be a single, closed, uniform photosensitive area.

At least two of the pixels may differ in size. The size of pixels may differ from each other. A Pixel size from different substrates or even the pixel sizes of a dual pixel detector may be different. A size of each pixel may be such that at least similar photodetector signal intensities are generated by each photodetector considering a photosensitivity of each pixel at a given wavelength and an intensity of an incident optical radiation on each pixel. In this way, it may be possible to get similar signal intensities from multiple detectors during the measurement, which may help to optimize the read-out electronics. Other embodiments of the pixels may also be feasible.

The pixel or pixels on each photodetectors may be manufactured from the same material. Alternatively, pixels of different pixel materials can be brought together in a multiple single detector assembly. Thus, the spectral measurement device may cover a broad wavelength range or can be optimized in respect of performance by varying e.g. the size of an active area. As an example, a multiple single detector assembly may have PbS and PbSe pixels of different size on different substrates.

As said, each pixel is an active pixel or a darkened pixel. The substrate may have only one photosensitive area or a dual photosensitive area, with one "active" area and one second "darkened" area by means of mechanical or optical measures. The spectral measurement device comprises at least two active pixels. Each active pixel is configured for generating at least one photodetector signal dependent on an illumination of the active pixel. At least two of the active pixels are configured for detecting optical radiation in at least partially different spectral ranges. The term "active pixel" as used herein is a broad term and is to be given its ordinary and customary meaning to a person of ordinary skill in the art and is not to be limited to a special or customized meaning. The term specifically may refer, without limitation, to a pixel which is arranged and/or configured to generate the photodetector signal in response to illumination of its photosensitive area. Active may refer to that the photosensitive area is illuminated in the sensitivity wavelength range during the measurement. The active pixel may generate a photodetector signal dependent on an illumination of the active pixel.

The spectral measurement device comprises at least one darkened pixel. The at least two active pixels and the at least one darkened pixel may be distributed over the at least two photodetectors arbitrarily. As an example, the spectral measurement device may comprise two photodetectors, wherein one photodetector comprises one active pixel and one darkened pixel and wherein one photodetector comprises one active pixel. The term "darkened pixel" as used herein is a broad term and is to be given its ordinary and customary meaning to a person of ordinary skill in the art and is not to be limited to a special or customized meaning. The term specifically may refer, without limitation, to a covered pixel. Darkened may refer to that no illumination in the sensitivity wavelength range of the photosensitive area reaches the photosensitive area. The darkened pixel may be covered by a material absorbing in the same wavelength range as the sensitivity range of the photodetector, and/or it may be a piece of metal on top of the photosensitive area reflecting the incident light away from the darkened pixel. The darkened pixel may be covered with a material absorbing the optical radiation such as glue and/or ink. Additionally or alternatively, the darkened pixel may be covered with at least one material reflecting the optical radiation such as a metal. The darkened pixel may specifically see no or at least almost no optical radiation. The darkened pixel may be embodied as extra photodetector with a single pixel, which is covered by above mentioned means, or photodetectors with dual pixels (on one single substrate) wherein one of the pixels is darkened may be used. The darkened pixel, as will be explained in more detail below, may be used for eliminating long-time drifts and temperature effects.

The darkened pixel is configured for generating at least one photodetector signal independent on an illumination of the darkened pixel. The term "independent on an illumination" as used herein is a broad term and is to be given its ordinary and customary meaning to a person of ordinary skill in the art and is not to be limited to a special or customized meaning. The term specifically may refer, without limitation, to the fact that the darkened pixel may be configured for generating the photodetector signal without photons entering the darkened pixel, in particular photons in a wavelength range in which the darkened pixel may be sensitive. Specifically, the term "independent on an illumination" may refer to the fact that an illumination of the darkened pixel may not affect the photodetector signal generated by the darkened pixel. As an example, a high intensity illumination of the darkened pixel may lead to the same photodetector signal as a low intensity illumination of the darkened pixel. An illumination of the darkened pixel in different wavelength ranges may lead to the same photodetector signal. The darkened pixel may be configured for generating the photodetector signal without being illuminated. Thus, the photodetector signal generated by the darkened pixel may at least predominantly depend on properties of the darkened pixel itself, e.g. on materials used within the darkened pixel. The photodetector signal generated by the darkened pixel may specifically comprise a dark signal, more specifically a dark current.

Each photodetector may comprise a maximum of one active pixel, wherein the spectral measurement device may comprise at least one darkened pixel. For example, each of the photodetectors may comprise two pixels, i.e. an active and a darkened pixel. For example, one of the photodetectors may comprise a single active pixel and another photodetector may comprise a darkened pixel. None of the photodetectors may have more than one active pixel. Each active pixel may be configured for detecting a specific spectral range and/or wavelength range. Thus, the respective photodetector may only be responsible for a specific spectral range.

As an example, the spectral measurement device may comprise three pixels, two pixels being active pixels and one pixel being a darkened pixel. Each photodetector may comprise at least one pixel, but not more than one active pixel. A photodetector with at least two pixels may darken all pixels except for one in order to have only one active pixel. Each active pixel may only be responsible for one wavelength range and there may never be two active pixels for identical wavelength ranges in the spectral measurement device. The spectral measurement device may for example comprise two photodetectors, wherein a first photodetector comprises two pixels, one active pixel and one darkened pixel, wherein a second photodetector comprises one active pixel. Further, the spectral measurement device may comprise three photodetectors, each having one pixel, wherein a first photodetector may comprise a darkened pixel, wherein a second photodetector and a third photodetector may each comprise an active pixel.

At least one of the photodetectors may comprise at least two pixels. At least one of the pixels may be an active pixel. At least one of the pixels may be a darkened pixel. Specifically, the photodetector may be a dual pixel photodetector. Thus, the photodetector may comprise an active pixel and a darkened pixel. The pixels may comprise the same photosensitive material. Thus, a calibration performed by using the darkened pixel may be based on the same photosensitive material the active pixel comprises. All pixels on one photodetector may comprise the same photosensitive material.

The spectral measurement device may comprise at least two radiation sources configured for emitting optical radiation in at least partially different spectral ranges. As an example, the spectral measurement device may comprise two different radiation sources, e.g. two different LEDs. Additionally or alternatively, the two radiation sources may comprise different optical filters. Each photodetector may be configured for detecting optical radiation emitted by a different and exactly one of the radiation sources. Each photodetector may be assigned for observing a different spectral range. Each photodetector may be assigned for observing spectral characteristics corresponding to a different class of the classification model. The spectral measurement device may comprise at least three photodetectors, specifically at least four photodetectors, more specifically at least five photodetectors. For example, the spectral measurement device may comprise 16 photodetectors or less. Specifically, the spectral measurement device may comprise at least three pixels. More specifically, the spectral measurement device may comprise at least two active pixels and at least one darkened pixel. Each active pixel may be comprised by a different photodetector. The two active pixels may each be used for observing different spectral ranges. The darkened pixel may be used for recalibrating the spectral measurement device, specifically for continuously or repeatedly recalibrating the spectral measurement device, e.g. in parallel to performing a classification based spectral measurement.

The evaluation device may be configured for automatically recalibrating the spectral measurement device by using at least one photodetector signal generated by using the darkened pixel. The term "automatic" including any grammatical variation thereof as used herein is a broad term and is to be given its ordinary and customary meaning to a person of ordinary skill in the art and is not to be limited to a special or customized meaning. The term specifically may refer, without limitation, to a process which is performed at least partially without the necessity of human interaction, such as at least partially by a machine. Specifically, the process may be performed at least partially by means of at least one of a processor, a controller, a computer, a computer network and a machine, in particular without manual action and/or interaction with a user. The term "calibrating" including any grammatical variation thereof, also including the term "recalibrating" as used herein is a broad term and is to be given its ordinary and customary meaning to a person of ordinary skill in the art and is not to be limited to a special or customized meaning. The term specifically may refer, without limitation, to correcting drifting effects which may occur in measurements in practice, primarily due to alterations related to hardware components and/or due to alterations having an effect onto the hardware components, specifically the spectral measurement device or parts thereof. The alterations may specifically comprise at least one of: a degradation of at least one of the radiation source or the photodetectors, specifically a pixel; a temperature drift of at least one of the radiation source or the photodetectors; a variation of an ambient temperature affecting the spectral measurement device; a variation of a temperature related to the spectral measurement device, i.e. the temperature at which the photodetectors and/or corresponding electronics may operate; a mechanical extension or contraction of at least one component as comprised by the spectral measurement device, specifically of at least one of a mechanical housing, a holder and an optical element. Further alterations may also be feasible. Electrochemical processes or physical processes such as a relaxation of long lifespan traps may induce the drifting effects. Correcting the drifting effects may particularly facilitate maintaining a reliability of the item of measurement information, specifically by avoiding that the drifting effects may distort the item of measurement information to such an extent that results as determined by the spectral measurement device may become inconclusive. Thus, regular calibration of the used hardware may typically be required in order to maintain reliability of the spectral measurement device. Automatically calibrating the spectral measurement device by using at least one photodetector signal generated by using the darkened pixel may be particularly consumer friendly. The photodetector signal generated by using a darkened pixel may be suited for correcting drifts, specifically long-time drifts, of the photodetectors, and further for correcting temperature effects on the photodetectors.

Each photodetector, in particular its pixel, is configured for generating at least one photodetector signal, also denoted as detector signal, dependent on an illumination of the pixel.

The photodetector signal may comprise at least one of an analog signal and a digital signal. The photodetector signal may specifically comprise at least one electronic signal associated with an intensity of the optical radiation impinging on the pixel. At least one of the photodetectors may comprise at least one signal processing device, such as one or more filters and/or analog-digital-converters for processing and/or preprocessing the photodetector signal.

A photodetector signal generated by using a darkened pixel, also referred to as a dark signal, may be independent of the optical radiation reaching the spectral measurement device. In other words, even though the optical radiation reaching the spectral measurement device may change, the photodetector signal generated by using a darkened pixel may stay constant. The photodetector signal generated by using a darkened pixel may be suited for correcting drifts, specifically long-time drifts, of the photodetectors. The photodetector signal generated by using a darkened pixel may temperature dependent. As an example, the darkened pixel may comprise at least on semiconducting material, in which a spontaneous formation of free charge carries may be thermally induced. Thus, the photodetector signal generated by using a darkened pixel may further be suited for correcting temperature effects on the photodetectors.

At least one of the photodetectors, specifically at least one of the pixels, may comprise a photoconductive material, in particular an inorganic photoconductive material, especially selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). As generally used, the term "ext. InGaAs" refers to a particular type of InGaAs which exhibits a spectral response up to 2.6 µm. Specifically, at least one of the photodetectors may be a PbS photodetector, wherein the emitted optical radiation comprises a wavelength of 760 400 nm to 3000 nm, specifically 1000 800 nm to 2700 nm, more specifically 1500 1200 nm to 2500 nm. At least one of the photodetectors may be a PbSe photodetector, wherein the emitted optical radiation comprises a wavelength of 400 nm to 5000 nm, specifically 800 nm to 4800 nm, more specifically 1200 nm to 4600 nm. However, different kinds of materials or other types of photodetectors may also be feasible.

The photodetectors may be isolated from each other in such a way that the crosstalk between the individual detectors and stray light is suppressed. This may be possible since the photodetectors are physically separated on individual substrates. Thus, the radiation at designated wavelengths can be detected much more precisely and without crosstalk.

The radiation source and/or at least one of photodetectors may be arranged such that directly reflected optical radiation from the measurement object does not reach the active pixels. The photodetectors may be configured for measuring diffusely reflected optical radiation from the measurement object. Each of the photodetectors may be configured for measuring diffusely reflected light from the measurement object and for generating a photodetector signal. The directly reflected light from the measurement object may be prevented for reaching the photodetectors as good as possible by means of a suitable positioning of the at least one radiation source and the photodetectors.

As said, at least two of the photodetectors are configured for detecting optical radiation in at least partially different spectral ranges. The term "at least partially different spectral ranges" as used herein is a broad term and is to be given its ordinary and customary meaning to a person of ordinary skill in the art and is not to be limited to a special or customized meaning. The term specifically may refer, without limitation, to spectral ranges which are not identical, wherein the spectral ranges may be overlapping or may not be overlapping. At least two of the photodetectors may be different, e.g. comprise pixels comprising different photoconductive materials. Specifically, each active pixel may be configured for detecting optical radiation having at least one spectral characteristic referring to at least one class of the classification model. Each active pixel may be configured for detecting optical radiation having at least one spectral characteristic referring to exactly one class of the classification model. As said, each class may specifically refer to at least one material having at least one distinct spectral characteristic or to at least one group of materials having similar spectral characteristics. Each spectral characteristic may refer to at least one predetermined and/or predefined spectral range. The spectral characteristic, e.g. an absorption peak of the material, may be located within the predetermined and/or predefined spectral range. The predetermined and/or predefined spectral range may be predetermined and/or predefined before measuring the optical radiation provided by the measurement object, specifically according to a predetermined classification. As an example, the classification based spectral measurement may be supposed to determine materials within a piece of clothing. Before measuring optical radiation provided by the piece of clothing, textile classes may be predetermined and/or predefined, wherein each textile class may comprise a spectral characteristic such as an absorption peak in a different predetermined and/or predefined spectral range. The predetermined and/or predefined spectral range may be at least one spectral range selected from the group consisting of: from 1650 nm to 1700 nm; from 1725 nm to 1800 nm; from 2050 nm to 2150 nm; from 2175 nm to 2225 nm. However, other predetermined and/or predefined spectral ranges are possible for other use cases.

At least one of the photodetectors may comprise at least one optical filter. For example, the optical filter may be an optical bandpass filter. For example, the optical filter may be an optical narrow bandpass (NPB) filter. The spectral range detected by the photodetector may be restricted to a spectral range related to at least one class of a classification, e.g. to exactly one class of the classification. The photodetector may be assigned to observing optical properties relating to at least one class of a classification, specifically to exactly one class of the classification. Each photodetector of the spectral measurement device may be assigned for observing a different spectral range. Each photodetector may be assigned for observing spectral characteristics corresponding to a different class of the classification model. The term "optical filter" as used herein is a broad term and is to be given its ordinary and customary meaning to a person of ordinary skill in the art and is not to be limited to a special or customized meaning. The term specifically may refer, without limitation, to an arbitrary device or object configured for selectively blocking optical radiation according to at least one physical property of the optical radiation such as a wavelength of the optical radiation and/or a polarization of the optical radiation. The term "optical bandpass filter" as used herein is a broad term and is to be given its ordinary and customary meaning to a person of ordinary skill in the art and is not to be limited to a special or customized meaning. The term specifically may refer, without limitation, to an optical filter which is configured for filtering incident optical radiation in such fashion that only a limited spectral range can pass the optical filter and propagate to objects behind the optical filter. The optical bandpass filter may be configured for only transmitting optical radiation from a minimum wavelength to a maximum wavelength.

The spectral measurement device may be designed specific to the respective use-case. The spectral measurement device may be configured for measuring application specific absorption bands. The photodetectors may be configured to the absorption bands and may comprise optical filters such as narrow bandpass (NBP) optical filters with application specific center wavelengths, full width half maximum (FWHM), out of region blocking level and range. Additionally or alternatively, the photodetectors may be configured to those application specific absorption bands by selecting suitable radiation sources such as LEDs emitting the sample specific wavelengths.

For example, a textile use-case may require e.g. the differentiation between different textiles into classes such as Cotton, Wool, Silk and Synthetic. Every textile has a certain characteristic infrared absorption spectrum. The literatures have already shown that there are certain absorption bands specific to certain material. For example, Cotton absorbs around 2100 nm, Wool around 1724 nm, synthetics around 1662 nm, etc. Thus, for this textile use-case, it may be sufficient to measure these four material specific absorption bands by configuring the detector pixels to these sample specific wavelengths, instead of measuring whole spectrum with an expensive spectrometer, since only specific wavelength components carry the information about the textile classes. Four photodetectors, e.g. photodetectors 1 to 4, may be used. The photodetectors may be configured to the wavelengths with the help of narrow bandpass (NBP) optical filters with center wavelengths and Full width half maximum (FWHM) as mentioned in table below:

|  | Center wavelength [nm] | FWHM [nm] |
| --- | --- | --- |
| Photodetector 1 - NBP filter 1 | 1660 | 20 |
| Photodetector 2 - NBP filter 2 | 1724 | 10 |
| Photodetector 3 - NBP filter 3 | 2100 | 50 |
| Photodetector 4 - NBP filter 4 | 2378 | 20 |

For example, a further use-case may require plastics classification, e.g. where PET is supposed to be classified from other plastic types such as PP, PE, etc. In this embodiment, 2 or 3 pixels may be used which are specific to those plastic classes.

The hardware solution designed for one use-case may not be applicable to another use-case. The application specific design proposed herein may comprise hardware and classification model predefined for a specific use-case.

The spectral measurement device comprises the at least one read-out device. The term "read-out device" as used herein is a broad term and is to be given its ordinary and customary meaning to a person of ordinary skill in the art and is not to be limited to a special or customized meaning. The term specifically may refer, without limitation, to an arbitrary device configured for quantifying and/or processing at least one physical property and/or a change in the at least one physical property detected by at least one measurement device, specifically by at least one photodetector. As mentioned above, the at least one photodetector may specifically comprise at least one photoconductive material such as PbS for instance. Photoconductive materials may generally change their conductivity upon illumination and, thus, their resistance, which may for example consequently be quantified in a resistance measurement. The measured resistance may allow to draw conclusions on an incident optical radiation. A resistance measurement may be conducted in comparison to further resistors, specifically further resistors with known resistance. The further resistors may in particular be arranged in a voltage divider within the read-out device. The read-out device may comprise at least one of a resistance meter, a voltage meter, a current meter, a lock-in amplifier, a voltage divider and an electrical pass filter.

The read-out device is configured for measuring the photodetector signals and generating at least one item of spectral data. The term "item of spectral data" as used herein is a broad term and is to be given its ordinary and customary meaning to a person of ordinary skill in the art and is not to be limited to a special or customized meaning. The term specifically may refer, without limitation, to at least one of knowledge or evidence providing a qualitative and/or quantitative description relating to spectral information on the measurement object, e.g. to a spectral characteristic. The item of spectral data may relate to an absorption of the optical radiation by the measurement object. The item of spectral data may comprise at least one absorption spectrum of the measurement object, wherein the absorption spectrum may comprise at least one absorption peak. The item of spectral data may be analog and/or digital. The read-out device may be configured for collecting the detector signals, wherein each detector signal may for example be indicative about a detected intensity of the optical radiation within a different spectral range. The read-out device may be configured for processing and/or preprocessing the detector signals. The read-out device may be configured for combining the detector signals in at least one spectrum, specifically in at least one absorption spectrum of the measurement object.

The spectral measurement device comprises the at least one evaluation device. The term "evaluation device" as used herein is a broad term and is to be given its ordinary and customary meaning to a person of ordinary skill in the art and is not to be limited to a special or customized meaning. The term specifically may refer, without limitation, to an arbitrary device adapted to perform the named operations, preferably by using at least one data processing device and, more preferably, by using at least one processor and/or at least one application-specific integrated circuit. As an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. As an example, the evaluation device may comprise one or more programmable devices such as one or more computers, application-specific integrated circuits (ASICs), Digital Signal Processors (DSPs), or Field Programmable Gate Arrays (FPGAs) which are configured to perform the evaluation. Additionally or alternatively, however, the evaluation device may also fully or partially be embodied by hardware. The evaluation device may further be configured for controlling the spectral measurement device or parts thereof. The evaluation device may specifically be configured for performing at least one measurement cycle in which a plurality of photodetector signals may be picked up. The information as determined by the evaluation device may be provided to at least one of a further apparatus and/or to a user, specifically in at least one of an electronic, visual, acoustic, or tactile fashion. The information as determined by the evaluation device may be stored in the memory storage and/or in a separate storage device and/or may be passed on via at least one interface, such as a wireless interface and/or a wire-bound interface.

The evaluation device comprises the at least one processor. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric coprocessor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processor (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like. The processor specifically may be configured, such as by software programming, for performing one or more evaluation operations.

The evaluation device comprises at least one memory storage. The term "memory storage" as used herein is a broad term and is to be given its ordinary and customary meaning to a person of ordinary skill in the art and is not to be limited to a special or customized meaning. The term specifically may refer, without limitation, to an arbitrary device configured for storing data, specifically in an organized way, such as in a database, more specifically in at least one database record. The memory storage may be an electronic and/or magnetic and/or mechanic memory storage. The memory storage may be writeable or read-only. The memory storage may be volatile or non-volatile. The memory storage may comprise at least one of a random-access memory (RAM), a read-only memory (ROM) and a flash memory. The memory storage may comprise at least one of a hard disk drive (HDD), a solid state drive (SSD) and a flash drive.

The memory storage is configured for storing at least one classification model. The classification model comprises a set of different classes. Each class refers to at least one spectral characteristic. The classification model is configured for classifying at least one item of input data into the classes. The term "classification model" as used herein is a broad term and is to be given its ordinary and customary meaning to a person of ordinary skill in the art and is not to be limited to a special or customized meaning. The term specifically may refer, without limitation, to a model or a scheme which can be used for performing at least one classification. The classification model may comprise predetermined and/or predefined classes such as classes predetermined and/or predefined by a user. The classification model may comprise the class boundaries. The classification model may comprise class properties such as at least one property shared by all entities within one class. The classification model may classify the item of input data into exactly one class. The classification model may classify the item of input data into a plurality of classes.

The classification model may be a global classification model. The term "global classification model" as used herein is a broad term and is to be given its ordinary and customary meaning to a person of ordinary skill in the art and is not to be limited to a special or customized meaning. The term specifically may refer, without limitation, to a hardware independent but application specific classification model. The classification model may be dependent on use-case specific wavelengths, in particular spectral ranges. For every application there may be a unique global model. The classification model may be independent of hardware conditions and/or operating conditions. Thus, the classification model may be applicable globally, specifically for different hardware components, e.g. photodetectors, used under different operating conditions, e.g. temperatures.

The classification model may comprise at least one algorithm for analyzing the item of input data and for classifying the item of input data into the classes. The classification model may comprise at least one trained model. The trained model may be trained on at least one training set, specifically by using machine learning. In this context, the term "training" including any grammatical variations thereof as used herein is a broad term and is to be given its ordinary and customary meaning to a person of ordinary skill in the art and is not to be limited to a special or customized meaning. The term specifically may refer, without limitation, to a process of determining parameters of a model and/or parameters used within an algorithm by using at least one training data set. Specifically, the algorithm may comprise the model. The training may comprise at least one optimization or tuning process, wherein a best parameter combination may be determined. As indicated, the training may be performed by using machine learning. The term "machine learning" as used herein is a broad term and is to be given its ordinary and customary meaning to a person of ordinary skill in the art and is not to be limited to a special or customized meaning. The term specifically may refer, without limitation, to a method of using artificial intelligence (AI) for automatic model building, in particular for the parametrizing model.

The training data set may comprise historical spectral data, e.g. obtained by at least one external device, specifically at least one further spectral measurement device. The further spectral measurement device may be a laboratory spectral measurement device.

The classification model may be generated by using at least one of Random Forest, K-means clustering and a Support Vector Machine (SVM), in particular depending on the application and the accuracy thereafter. The term "Random Forest", also denoted as random forest algorithm, as used herein is a broad term and is to be given its ordinary and customary meaning to a person of ordinary skill in the art and is not to be limited to a special or customized meaning. The term specifically may refer, without limitation, to an ensemble learning method configured for at least classification and/or regression. Specifically, the random forest algorithm may be configured for constructing one or more decision trees and outputting at least one class selected from the mode of the classes and the mean prediction of the individual trees. The random forest algorithm may generally be known, e.g. from journal paper by Leo Breiman, "Random Forests" in Machine Learning 45.1, October 2001. The term "K-means clustering", also denoted as k-means algorithm, as used herein is a broad term and is to be given its ordinary and customary meaning to a person of ordinary skill in the art and is not to be limited to a special or customized meaning. The term specifically may refer, without limitation, to an algorithm using vector quantization for classifying entities. The K-means clustering may be performed as described in J. A. Hartigan, M. A. Wong: "Algorithm AS 136: A K-Means Clustering Algorithm", Journal of the Royal Statistical Society, Series C (Applied Statistics). Vol. 28, No., 1979, p. 100-108. The term "SVM" as used herein is a broad term and is to be given its ordinary and customary meaning to a person of ordinary skill in the art and is not to be limited to a special or customized meaning. The term specifically may refer, without limitation, to a set of related supervised learning methods used for classification and regression, see e.g. V. Vapnik. "The Nature of Statistical Learning Theory", Springer, N.Y., 1995. ISBN 0-387-94559-8.

The classification model is configured for classifying at least one item of input data into the classes. The term "item of input data" as used herein is a broad term and is to be given its ordinary and customary meaning to a person of ordinary skill in the art and is not to be limited to a special or customized meaning. The term specifically may refer, without limitation, to at least one of knowledge or evidence providing a qualitative and/or quantitative description relating to information which are recorded and/or structured in such fashion that they can be interpreted within at least one entity, e.g. a model, a program, a processor or a network, specifically for further processing. Specifically, the item of input data is as said applicable to the classification model. The classification model may be configured for interpreting the item of input data, for processing the item of input data and specifically for classifying the item of input data and/or a processed item of input data. The classification model may specifically be application oriented. As an example, the classification may, as said, refer to a material analyzation of a piece of clothing, wherein the classes may be textile classes such as cotton or wool. In this example, the classification model may be configured for classifying input data in form of processed spectral data referring to the piece of clothing into the textile classes.

The memory storage is configured for storing the at least one transfer function. The transfer function is configured for transferring the item of spectral data into the item of input data applicable to the classification model. The global classification model may be employed with the help of the transfer function to any similar hardware designed for that particular use-case. Data measured by the spectral measurement device is strongly dependent on the hardware tolerances and ambient conditions such as temperature and humidity. As an example, the read-out device of the spectral measurement device may generate an item of spectral data according to a spectral measurement on a measurement object. The item of spectral data may first of all depend on the measurement object, e.g. on absorption characteristics of the measurement object. However, the item of spectral data may further depend on the spectral measurement device itself, specifically on the hardware of the spectral measurement device such as the used photodetectors. Additionally, the item of spectral data may depend on operating conditions of the spectral measurement device during the spectral measurement, e.g. temperature. The transfer function may convert data measured by the spectral measurement device in such a way that the data become applicable to the global classification model offline on any similar device. Similar devices may refer to predefined hardware with predefined filters, number of pixels, pixel geometries etc.

The term "transfer function" as used herein is a broad term and is to be given its ordinary and customary meaning to a person of ordinary skill in the art and is not to be limited to a special or customized meaning. The term specifically may refer, without limitation, to an arbitrary function or algorithm for transferring data. The transfer may comprise at least one conversion of data, specifically adapting data for further processing, more specifically for adapting data for further processing within at least one specific entity such as a specific model. The transfer may comprise transfer of data in such fashion that information comprised by the data is at least partially maintained. Specifically, information which is relevant for further evaluation of the data may be maintained, while a format of the data may be changed. Additionally or alternatively, further information may be added. E.g. for considering the hardware and/or the operating conditions for further evaluation, information on the hardware and/or the operating conditions may be added to the item of spectral data and/or the item of spectral data may be adapted by taking the information on the hardware and/or the operating conditions into account, specifically when generating at least one item of input data applicable to the classification model by using the transfer function. The transfer function may comprise at least one parametrized mathematical function comprising at least one parameter. The transfer function may be a function of coefficients corresponding to the pixels. The transfer function may consider at least one of hardware of the spectral measurement device and operating conditions of the spectral measurement device. Specifically, the parameter of the transfer function may be selected to weigh the photodetector signals, more specifically according to at least one of applied geometry of the pixels and applied material for the pixels. As an example, the spectrometer device may comprise at least two pixels with different geometries and/or different active materials. Thus, the two pixels may induce different photodetectors signals for identical incident optical radiation comprising spectral information on one measurement object. By using the transfer function for transferring an item of spectral data into an item of input data applicable to the classification model, the different geometries and/or different active materials may be taken into account when classifying the measurement object, e.g. in at least one material class, by using the classification model. The transfer function may allow material classification applications to be localized to hardware and hence mass deployed. The transfer function may for example be derived from a known item of spectral data obtained by using a reference device on a reference sample. The reference device may e.g. comprise a high-end laboratory device. The reference sample may e.g. comprise a known sample such as a known material. Specifically, the transfer function may comprise at least one predetermined coefficient. The parametrized mathematical function may comprise at least one matrix M, e.g. in the form:

$$Y = MX,$$

wherein Y is a vector comprising the item of input data, wherein X is a vector comprising the item of spectral data. Thus, the predetermined coefficient may for example be an element of the matrix M. The parameters of the matrix M may be determined by comparing a measured item of spectral data to a known item of spectral data, e.g. obtained by using a reference device on a reference sample. The matrix M may for example comprise device properties, e.g. detectivity, or temperature compensation parameters or humidity compensation parameters. The transfer function may further comprise at least one look-up table. The look-up table may be configured for matching the item of spectral data to the item of input data applicable to the classification model.

As a particular example, the transfer function may allow for a temperature compensation. Thus, the matrix M may comprise temperature compensation parameters as elements. The temperature compensation parameters may for example be read from a look-up table.

The evaluation device is configured for generating at least one item of measurement information by applying the classification model and the transfer function to the item of spectral data. The term "item of measurement information" as used herein is a broad term and is to be given its ordinary and customary meaning to a person of ordinary skill in the art and is not to be limited to a special or customized meaning. The term specifically may refer, without limitation, to knowledge or evidence providing a qualitative and/or quantitative description relating to at least one measurement, specifically to at least one measurement object. The item of measurement information may comprise at least one of a physical property of the measurement object and a chemical property of the measurement object, specifically a chemical composition of the measurement object. The physical property may specifically comprise an optical property such at least one absorptivity of the measurement object and/or at least one emissivity of the measurement object. The chemical composition may specifically refer to qualitative and/or quantitative information on at least one material the measurement object comprises. The evaluation device may be configured for performing a classification of the measurement object based on the item of measurement information. The item of measurement information and thus the measurement object may be assigned to one or more classes, e.g. classes predetermined by a user. Additionally or alternatively, the item of measurement information may be used for generating and/or defining at least one class, e.g. a new material class.

The transfer function may be updated, in particular recalibrated, by a user of the spectral measurement device or automatically by the spectral measurement device. For example, the evaluation device may further be configured for adapting the transfer function such as when a calibration measurement is performed. The calibration measurement may be performed once a change in operating and ambient conditions of the classification based spectral measurement exceeds a predefined limit. Specifically, the calibration measurement may be performed once at least one of: a radiation power of the radiation source falls below a predetermined threshold, e.g. due to degradation; the photodetector signal of the photodetector falls below a predetermined threshold, e.g. due to degradation or hysteresis; an ambient temperature exceeds a predetermined threshold and/or falls below a predetermined threshold, an ambient humidity exceeds a predetermined threshold and/or falls below a predetermined threshold; an ambient light intensity exceeds a predetermined threshold and/or falls below a predetermined threshold. Specifically, the evaluation device may be configured for updating the transfer function accordingly when a change in hardware conditions and/or operation conditions is detected in the calibration measurement. As an example, the calibration measurement may reveal a change in a responsivity of at least one photodetector, e.g. due to a degradation of at least one pixel. Then, a weighting of the pixel may be adapted in the transfer function, specifically by adapting a corresponding parameter of the transfer function.

For example, for automatic self-calibration, the spectral measurement device may be equipped as described in EP application No. 20211174.6 filed on Dec. 2, 2020. The calibration measurement may be performed by using a sample interface. At least one of the photodetectors may be configured for generating at least one reference photodetector signal. Specifically, at least one of the photodetectors may be configured for detecting optical radiation reflected from the sample interface and for generating at least one corresponding reference photodetector signal. The sample interface may be configured for reflecting optical radiation from the radiation source without reaching it to the measurement object. Specifically, the sample interface may be configured for at least partially directing the optical radiation emitted by the radiation source towards the photodetectors in such fashion that the optical radiation does not pass the measurement object before. The sample interface material may be chosen to reflect a part of light, for example 15%, 20% or 25% depending on the classification application, the reflected light from the sample interface being measured as a reference signal by the photodetectors. For example, the sample interface may comprise an optical element, in particular an optical window, preferably, selected from a glass window or a silicon window. For example, a beam splitter may be used. The optical element may be made of transparent material preferably at least partially transparent material in at least one partition of a wavelength range as covered by the optical radiation. The optical element may be configured to guide a first portion of the optical radiation as emitted by the radiation source directly to at least one of the photodetectors. Thus, the signal generated in response to this illumination can be used as reference signal. Additionally or alternatively, instead of using a Fresnel reflection of window materials, the spectral measurement device may be equipped with integrated diffuse reflection targets, also denoted as integrated calibration target, which may be used as calibration target, if no sample is present. The integrated calibration target may be configured for at least partially directing the optical radiation emitted by the radiation source towards the photodetectors with a predefined spectrum, specifically diffusely. The sample interface may specifically comprise precisely known and stable physical properties.

The spectral measurement device may comprise at least one communication interface configured for transmitting data from and/or to the evaluation device. Specifically, the communication interface may be configured for receiving instructions, commands, data, parameters and the like for adapting the classification model and/or the transfer function. Thus, the classification model and/or the transfer function may be adapted by a user and/or by an external source such as in an available update, specifically in an automatic update. The term "communication interface" as used herein is a broad term and is to be given its ordinary and customary meaning to a person of ordinary skill in the art and is not to be limited to a special or customized meaning. The term specifically may refer, without limitation, to an object or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may further comprise at least one display device. The communication interface may be at least one web interface.

The spectral measurement device may comprise at least one temperature sensor. The temperature sensor may be configured for compensating the photodetector signal for an ambient temperature. Additionally or alternatively, the spectral measurement device may comprise at least one temperature stabilizing element, specifically a thermoelectric cooler. Specifically, at least one of the photodetectors and the radiation source may be positioned on and/or connected to the temperature stabilizing element. The spectral measurement device may comprise at least one humidity sensor configured for compensating the photodetector signal for an ambient humidity.

In a further aspect of the present invention, a method for measuring optical radiation provided by at least one measurement object by performing a classification based spectral measurement by using the spectral measurement device according to any one of the embodiments disclosed above or below in further detail. The method comprises the following steps:
a) emitting optical radiation at least partially towards the measurement object by using the at least one radiation source, wherein the optical radiation is at least partially in the spectral range of interest for the classification based spectral measurement;
b) detecting the optical radiation provided by the measurement object and generating at least one photodetector signal by using the at least two photodetectors;
c) measuring the photodetector signal and generating at least one item of spectral data by using the at least one read-out device;
d) transferring the item of spectral data into at least one item of input data applicable to the classification model by using the transfer function; and
e) generating at least one item of measurement information by using the classification model.

The method may further comprise the following steps:
f) performing at least one calibration measurement once the change in operating conditions and/or ambient conditions of the classification based spectral measurement exceeds a predefined limit; and
g) adapting the transfer function corresponding to the calibration measurement.

The method steps may be performed in the given order. It shall be noted, however, that a different order is also possible. The method may comprise further method steps which are not listed.

Further, one or more of the method steps may be performed once or repeatedly. Further, two or more of the method steps may be performed simultaneously or in a timely overlapping fashion. For further definitions and embodiments of the method it may be referred to the definitions and embodiments of the spectral measurement device.

The method may further comprise retrieving at least one classification model and at least one transfer function in the at least one evaluation device. The term "retrieving" including any grammatical variations thereof as used herein is a broad term and is to be given its ordinary and customary meaning to a person of ordinary skill in the art and is not to be limited to a special or customized meaning. The term specifically may refer, without limitation, to selecting and/or loading an entity such as a model or function. Specifically, a plurality of a classification models and/or transfer functions may be stored in the memory storage of the spectral measurement device. A user may then select at least one classification model and/or at least one transfer function which are to be used for the classification based spectral measurement. The spectral measurement device may be configured for recommending at least one classification model based on the generated item of spectral data. Additionally or alternatively, the spectral measurement device may be configured for recommending at least one transfer function based on the used hardware, e.g. photodetectors, and/or operating conditions, e.g. temperature measured by a temperature sensor. Additionally or alternatively, the spectral measurement device may be configured for independently choosing at least one classification model based on the generated item of spectral data. Additionally or alternatively, the spectral measurement device may be configured for independently choosing at least one transfer function based on the used hardware, e.g. photodetectors, and/or operating conditions, e.g. temperature measured by a temperature sensor. At least one classification model and/or at least one transfer function may be downloaded from at least one external source, e.g. by using the communication interface of the spectral measurement device.

The method may be computer implemented. Specifically, one or more of the method steps may be performed by using a computer or computer network, more specifically by using a computer program. Thus, generally, any of the method steps including provision and/or manipulation of data may be performed by using a computer or computer network. Generally, these method steps may include any of the method steps, typically except for method steps requiring manual work, such as providing the measurement object and/or certain aspects of performing the actual measurements.

Further disclosed and proposed herein is a computer program. The computer program comprises instruction which, when the program is executed by the spectral measurement device according to any one of the embodiments disclosed above or below in further detail referring to a spectral measurement device, cause the spectral measurement device to perform the method according to any one of the embodiments disclosed above or below in further detail referring to a method.

Further disclosed and proposed herein is a computer-readable storage medium. The computer-readable storage medium comprises instructions which, when the program is executed by the spectral measurement device according to any one of the embodiments disclosed above or below in further detail referring to a spectral measurement device, cause the spectral measurement device to perform the method according to any one of the embodiments disclosed above or below in further detail referring to a method. The computer-readable storage medium may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

In a further aspect of the present invention, a use of a spectral measurement device according to any one of the embodiments disclosed above or below in further detail referring to a spectral measurement device is proposed, for a purpose of use selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application; and a textiles identification and/or recycling application.

The devices and methods according to the present invention may provide a large number of advantages over known methods, stations and systems. In particular, the devices and methods may allow for both recording and analyzing spectral data by using a miniaturized apparatus, specifically a handheld apparatus. Thus, results of spectral measurements may be presented to a user in a consumer friendly and fast fashion. No extensive computing power may be required for analyzing the data, such that it can directly be integrated within the handheld apparatus. Further, data analysis may easily be adapted to different hardware or operating conditions by using a global classification model and a local transfer function which may consider said hardware and operating conditions. The devices and methods may specifically be low cost, but nevertheless very reliable thanks to regular calibration of the hardware. Typically, performing such a calibration may require technical expertise, which is not very consumer friendly. However, here the calibration may be performed automatically, e.g. by using a darkened pixel of a photodetector. Additionally or alternatively, the calibration may be performed by using a designated optical element, specifically an internal calibration target. Thus, user interaction and required technical expertise can be kept at a minimum. Further, potentially varying operating conditions may automatically be observed and considered for data analysis, e.g. by using said darkened pixel or a designated sensor.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, nonwithstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing and without excluding further possible embodiments, the following embodiments may be envisaged:

Embodiment 1. A spectral measurement device for measuring optical radiation provided by at least one measurement object in at least one classification based spectral measurement, the spectral measurement device comprising:
  at least one radiation source configured for emitting optical radiation at least partially towards the measurement object, wherein the optical radiation is at least partially in the spectral range of interest for the classification based spectral measurement;
  at least two photodetectors, wherein each photodetector comprises at least one pixel, wherein each pixel is an active pixel or a darkened pixel, wherein the spectral measurement device comprises at least two active pixels, wherein the spectral measurement device comprises at least one darkened pixel, wherein each active pixel is configured for generating at least one photodetector signal dependent on an illumination of the pixel, wherein at least two of the active pixels are configured for detecting optical radiation in at least partially different spectral ranges, wherein each darkened pixel is configured for generating at least one photodetector signal independent on an illumination of the darkened pixel;
  at least one read-out device configured for measuring the photodetector signals and generating at least one item of spectral data; and
  at least one evaluation device comprising at least one processor and at least one memory storage, wherein the memory storage is configured for storing
    at least one classification model comprising a set of different classes, wherein each class refers to at least one spectral characteristic, wherein the classification model is configured for classifying at least one item of input data into the classes; and
    at least one transfer function configured for transferring the item of spectral data into the item of input data applicable to the classification model;
  wherein the evaluation device is configured for generating at least one item of measurement information by applying the classification model and the transfer function to the item of spectral data.

Embodiment 2. The spectral measurement device according to the preceding embodiment, wherein each photodetector comprises a maximum of one active pixel, wherein the spectral measurement device comprises at least one darkened pixel, wherein the evaluation device is configured for automatically recalibrating the spectral measurement device by using at least one photodetector signal generated by using the darkened pixel.

Embodiment 3. The spectral measurement device according to any one of the preceding embodiments, wherein each active pixel is configured for detecting optical radiation having at least one spectral characteristic referring to at least one class of the classification model.

Embodiment 4. The spectral measurement device according to any one of the preceding embodiments, wherein each class refers to at least one material having at least one distinct spectral characteristic or to at least one group of materials having similar spectral characteristics.

Embodiment 5. The spectral measurement device according to the preceding embodiment, wherein the material is at least one material selected from the group consisting of: synthetic textile; cotton; wool; silk; Polyethylene terephthalate (PET); Polypropylene (PP); Polyethylene (PE); Polyvinyl chloride (PVC); high-density Polyethylene (HDPE); low density Polyethylene (LDPE); Polyamide (PA); glass.

Embodiment 6. The spectral measurement device according to any one of the preceding embodiments, wherein each spectral characteristic refers to at least one predetermined and/or predefined spectral range.

Embodiment 7. The spectral measurement device according to the preceding embodiment, wherein the predetermined and/or predefined spectral range is at least one spectral range selected from the group consisting of: from 1650 nm to 1700 nm; from 1725 nm to 1800 nm; from 2050 nm to 2150 nm; from 2175 nm to 2225 nm.

Embodiment 8. The spectral measurement device according to any one of the preceding embodiments, wherein the classification model is based on at least one algorithm being trained on historical spectral data obtained by at least one external device, specifically at least one further spectral measurement device.

Embodiment 9. The spectral measurement device according to any one of the preceding embodiments, wherein the classification model is generated by using at least one of Random Forest, K-means clustering and SVM.

Embodiment 10. The spectral measurement device according to any one of the preceding embodiments, wherein the transfer function comprises at least one parametrized mathematical function comprising at least one parameter, wherein the transfer function considers at least one of hardware of the spectral measurement device and operating conditions of the spectral measurement device.

Embodiment 11. The spectral measurement device according to the preceding embodiment, wherein the parameter of the transfer function is selected to weight the photodetector signals.

Embodiment 12. The spectral measurement device according to any one of the two preceding embodiments, wherein the parametrized mathematical function comprises at least one matrix.

Embodiment 13. The spectral measurement device according to any one of the preceding embodiments, wherein the transfer function comprises at least one look-up table.

Embodiment 14. The spectral measurement device according to any one of the preceding embodiments, wherein the item of measurement information comprises at least one of a physical property of the measurement object and a chemical property of the measurement object, specifically a chemical composition of the measurement object.

Embodiment 15. The spectral measurement device according to any one of the preceding embodiments, wherein the evaluation device is configured for performing a classification of the measurement object based on the item of measurement information.

Embodiment 16. The spectral measurement device according to any one of the preceding embodiments, wherein the spectral measurement device is configured for performing at least one calibration measurement.

Embodiment 17. The spectral measurement device according to the preceding embodiment, wherein the evaluation device is further configured for adapting the transfer function when a calibration measurement is performed.

Embodiment 18. The spectral measurement device according to any one of the preceding embodiments, wherein the radiation source comprises at least one of a semiconductor-based radiation source and a thermal radiator.

Embodiment 19. The spectral measurement device according to the preceding embodiment, wherein the at least one semiconductor-based radiation source is selected from at least one of a light emitting diode (LED) or a laser, specifically a laser diode.

Embodiment 20. The spectral measurement device according to any one of the preceding embodiments, wherein the radiation source is modulated.

Embodiment 21. The spectral measurement device according to any one of the preceding embodiments, wherein at least one of the photodetectors is a PbS photodetector, wherein the emitted optical radiation comprises a wavelength of 400 nm to 3000 nm, specifically 800 nm to 2700 nm, more specifically 1200 nm to 2500 nm.

Embodiment 22. The spectral measurement device according to any one of the preceding embodiments, wherein at least one of the photodetectors is a PbSe photodetector, wherein the emitted optical radiation comprises a wavelength of 400 nm to 5000 nm, specifically 800 nm to 4800 nm, more specifically 1200 nm to 4600 nm.

Embodiment 23. The spectral measurement device according to any one of the preceding embodiments, wherein the spectral measurement device comprises at least two radiation sources configured for emitting optical radiation in at least partially different spectral ranges.

Embodiment 24. The spectral measurement device according to the preceding embodiment, wherein each photodetector is configured for detecting optical radiation emitted by a different and exactly one of the radiation sources.

Embodiment 25. The spectral measurement device according to any one of the preceding embodiments, wherein the spectral measurement device comprises at least three photodetectors, specifically at least four photodetectors more specifically at least five photodetectors.

Embodiment 26. The spectral measurement device according to any one of the preceding embodiments, wherein the spectral measurement device comprises at least three pixels.

Embodiment 27. The spectral measurement device according to any one of the preceding embodiments, wherein the spectral measurement device comprises at least two active pixels and at least one darkened pixel.

Embodiment 28. The spectral measurement device according to any one of the preceding embodiments, wherein at least one of the photodetectors comprises at least two pixels.

Embodiment 29. The spectral measurement device according to the preceding embodiment, wherein at least one of the pixels is an active pixel and at least one of the pixels is a darkened pixel.

Embodiment 30. The spectral measurement device according to any one of the two preceding embodiments, wherein the pixels comprise the same photosensitive material.

Embodiment 31. The spectral measurement device according to any one of the preceding embodiments, wherein at least two of the pixels differ in size.

Embodiment 32. The spectral measurement device according to any one of the preceding embodiments, wherein a size of each pixel is such that at least similar photodetector signal intensities are generated by each photodetector.

Embodiment 33. The spectral measurement device according to any one of the preceding embodiments, wherein at least one of the photodetectors comprises at least one optical filter, specifically an optical bandpass filter, more specifically an optical narrow bandpass (NBP) filter.

Embodiment 34. The spectral measurement device according to any one of the preceding embodiments, wherein the radiation source and/or at least one of photodetectors are arranged such that directly reflected optical radiation from the measurement object does not reach at least one of the active pixels.

Embodiment 35. The spectral measurement device according to any one of the preceding embodiments, wherein at least one of the photodetectors is configured for measuring diffusely reflected optical radiation from the measurement object.

Embodiment 36. The spectral measurement device according to any one of the preceding embodiments, wherein at least one of the photodetectors is isolated by at least one isolating material.

Embodiment 37. The spectral measurement device according to any one of the preceding embodiments, wherein at least one of the photodetectors, specifically at least one of the pixels, comprises at least one photoconductive material.

Embodiment 38. The spectral measurement device according to the preceding embodiment, wherein the photoconductive material is selected from at least one of PbS, PbSe, Ge, InGaAs, InSb, or HgCdTe.

Embodiment 39. The spectral measurement device according to any one of the preceding embodiments, wherein the measurement object comprises at least one solid sample.

Embodiment 40. The spectral measurement device according to any one of the preceding embodiments, wherein the spectral measurement device comprises at least one sample interface configured for at least partially directing the optical radiation emitted by the radiation source towards the photodetectors with a predefined spectrum.

Embodiment 41. The spectral measurement device according to the preceding embodiment, wherein at least one of the photodetectors is configured for detecting the optical radiation reflected from the sample interface and for generating at least one corresponding reference photodetector signal.

Embodiment 42. The spectral measurement device according to any one of the preceding embodiments, wherein the read-out device comprises at least one of a resistance meter, a voltage meter, a current meter, a lock-in amplifier, a voltage divider and an electrical pass filter.

Embodiment 43. The spectral measurement device according to any one of the preceding embodiments, wherein the spectral measurement device comprises at least one temperature sensor configured for compensating the photodetector signal for an ambient temperature.

Embodiment 44. The spectral measurement device according to any one of the preceding embodiments, wherein the spectral measurement device comprises at least one temperature stabilizing element, specifically a thermoelectric cooler.

Embodiment 45. The spectral measurement device according to any one of the preceding embodiments, wherein the spectral measurement device comprises at least one humidity sensor configured for compensating the photodetector signal for an ambient humidity.

Embodiment 46. The spectral measurement device according to any one of the preceding embodiments, wherein the spectral measurement device comprises at least one communication interface configured for transmitting data from and/or to the evaluation device, specifically for adapting the classification model and/or the transfer function, wherein the spectral measurement device comprises at least one optical element, specifically at least one integrated calibration target, configured for at least partially directing the optical radiation emitted by the radiation source towards the photodetectors with a predefined spectrum.

Embodiment 47. The spectral measurement device according to the preceding embodiment, wherein the optical element is configured for at least partially reflecting the optical radiation emitted by the radiation source towards the photodetectors with a predefined reflection spectrum, specifically diffusely.

Embodiment 48. A method for measuring optical radiation provided by at least one measurement object by performing a classification based spectral measurement by using the spectral measurement device according to any one of the preceding embodiments, the method comprising:
a) emitting optical radiation at least partially towards the measurement object by using the at least one radiation source, wherein the optical radiation is at least partially in the spectral range of interest for the classification based spectral measurement;
b) detecting the optical radiation provided by the measurement object and generating at least one photodetector signal by using the at least two photodetectors;
c) measuring the photodetector signal and generating at least one item of spectral data by using the at least one read-out device;
d) transferring the item of spectral data into at least one item of input data applicable to the classification model by using the transfer function; and
e) generating at least one item of measurement information by using the classification model.

Embodiment 49. The method according to the preceding embodiment, further comprising:

f) performing at least one calibration measurement once the change in operating conditions and/or ambient conditions of the classification based spectral measurement exceeds a predefined limit; and g) adapting the transfer function corresponding to the calibration measurement.

Embodiment 50. The method according to any one of the preceding method embodiments referring to a method, wherein the method comprises retrieving at least one classification model and at least one transfer function in the at least one evaluation device.

Embodiment 51. The method according to any one of the preceding method embodiments referring to a method, wherein the method is computer-implemented.

Embodiment 52. A computer program comprising instructions which, when the program is executed by the spectral measurement device according to any one of the preceding embodiments referring to a spectral measurement device, cause the spectral measurement device to perform the method according to any one of the preceding embodiments referring to a method.

Embodiment 53. A computer-readable storage medium comprising instructions which, when the program is executed by the spectral measurement device according to any one of the preceding embodiments referring to a spectral measurement device, cause the spectral measurement device to perform the method according to any one of the preceding embodiments referring to a method.

Embodiment 54. A use of the spectral measurement device according to any one of the preceding embodiments referring to a spectral measurement device, for a purpose of use, selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application; and a textiles identification and/or recycling application.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
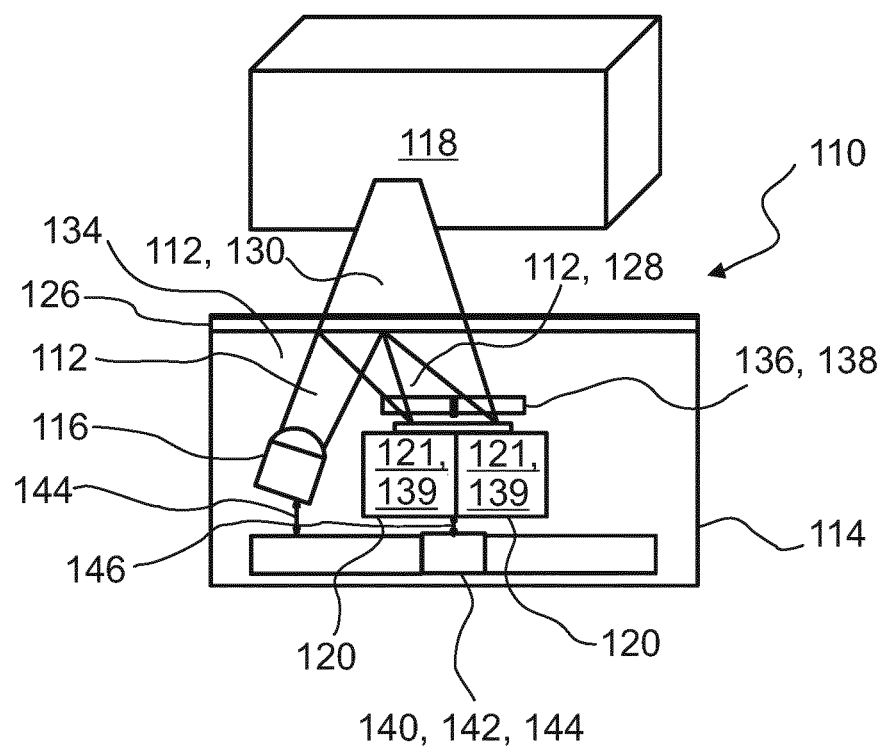
FIG. 1 illustrates a schematic view of an exemplary embodiment of a spectral sensing device.

FIG. 1 illustrates, in a highly schematic fashion, an exemplary embodiment of a spectral measurement device 110 according to the present invention. The spectral measurement device 110 is an apparatus which is configured to determine spectral information by recording at least one measured value for at least one signal intensity related to at least one corresponding signal wavelength of optical radiation 112 and by evaluating at least one photodetector signal which relates to the signal intensity. In the embodiments as depicted in FIG. 1, the spectral measurement device 110 comprises a housing 114 which encompasses the components of the spectral measurement device 110. In this fashion, the components of the spectral measurement device 110 can be protected and access of external light may be impeded. However, further kinds of arrangements of the components of the spectral measurement device 110 may also be conceivable.

As said, the spectral measurement device 110 is configured for measuring the optical radiation in at least one classification based spectral measurement. The class may be a group of entities, e.g. objects or elements, sharing at least one property. The shared property may refer to a physical property, specifically an optical property such as a spectral characteristic of an object or element. The shared property may further refer to a chemical property such as a chemical composition of an object. As an example, a shared property of a plurality of objects may be a common material they all contain. Specifically, each class may refer to at least one material having at least one distinct spectral characteristic or to at least one group of materials having similar spectral characteristics. The spectral characteristic may specifically comprise at least one absorption peak of the material and/or a physical quantity associated with the absorption peak. More specifically, the material may be at least one material selected from the group consisting of: synthetic textile; cotton; wool; silk; Polyethylene terephthalate (PET); Polypropylene (PP); Polyethylene (PE); Polyvinyl chloride (PVC); high-density Polyethylene (HDPE); low density Polyethylene (LDPE); Polyamide (PA); glass. Generally, the term category may also be used synonymously for the term class. The classification may first of all comprise analyzing the entities and identifying the shared properties. As an example, the classification may specifically refer to analyzing a chemical composition of objects and grouping objects comprising a common material in one class. The classification may also refer to generating and/or defining classes, specifically to defining class boundaries. As an example, the classification may set at least one limit for a physical property as a class boundary such as at least one of a density; a concentration and a thickness. As a further example, the classification may set at least one maximum deviation from a predetermined condition or status as a class boundary. For instance, measurement objects mainly consisting of one material except for a predetermined deviating portion may be grouped in one class. Thus, the class may specifically be defined by the material. The classification may comprise assigning entities to at least one class. In principle, it may be possible to simultaneously assign an entity to a plurality of classes. Thus, given a defined class, at least one entity may be assigned to it, specifically in case the entity shares at least one property with further entities the class already comprises or in case it the entity lies within defined class boundaries. As an example, a class may be defined by a material. Then, a measurement object may be assigned to the class or category in the case the measurement object comprises the material, at least to a predetermined extent, which may for instance be determined by measuring at least one physical property of the object such as an optical property, e.g. an absorption. The classification based spectral measurement may be a spectral measurement, wherein measured spectral data and/or preprocessed measured spectral data is subsequently classified. A result or an interim result of the classification based spectral measurement may specifically comprise information about a class which the measurement object can be assigned to.

The spectral measurement device 110 comprises at least one radiation source 116 configured for emitting optical radiation 112 at least partially towards the measurement object 118, wherein the optical radiation 112 is at least partially in the spectral range of interest for the classification based spectral measurement. In particular, the radiation source 116 may be comprised by a semiconductor-based radiation source 116 which may, preferably, be selected from at least one of a light emitting diode (LED) or a laser, in particular a laser diode. However, a further type of radiation source 116 may also be feasible. The radiation source 116 may be continuously emitting, or generating modulated optical pulses.

The exemplary spectral measurement device 110 comprises at least two photodetectors 120. The photodetector 120 may comprise at least one substrate. A single photodetector 120 may be a substrate with at least one single photosensitive area, which generates a physical response to the illumination for a given wavelength range. Each photodetector 120 comprises at least one pixel 121. Embodiments of pixels are shown in FIGS. 2 and 3. Each photodetector 120 is configured for generating at least one photodetector signal dependent on an illumination of the pixel 121. At least two of the photodetectors 120 are configured for detecting optical radiation in at least partially different spectral range. The pixel 121 may be illuminated by the optical radiation and may generate in response to the illumination at least one photodetector signal. The pixel 121 may be located on a surface of the photodetector 120, specifically on the substrate. Further, the pixel 121 may specifically be a single, closed, uniform photosensitive area.

At least two of the pixels 121 may differ in size. The size of pixels may differ from each other. Pixel size from different substrates or even the pixel sizes of a dual pixel detector may be different. A size of each pixel 121 may be such that at least similar photodetector signal intensities are generated by each photodetector 120 considering a photosensitivity of each pixel at a given wavelength and an intensity of an incident optical radiation on each pixel. In this way, it may be possible to get similar signal intensities from multiple detectors during the measurement, which may help to optimize the read-out electronics. Other embodiments of the pixels 121 may also be feasible.

The pixel 121 or pixels 121 on each photodetectors 120 may be manufactured from the same material. Alternatively, pixels of different pixel materials can be brought together in a multiple single detector assembly. Thus, the spectral measurement device may cover a broad wavelength range or can be optimized in respect of performance by varying e.g. the size of an active area. As an example, a multiple single detector assembly may have PbS and PbSe pixels of different size on different substrates.

The pixels 121 may, preferably, comprise at least one photoconductive material, particularly, selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). Specifically, at least one of the photodetectors 120 may be a PbS photodetector, wherein the emitted optical radiation 112 comprises a wavelength of 760 400 nm to 3000 nm, specifically 1000 800 nm to 2700 nm, more specifically 1500 1200 nm to 2500 nm. At least one of the photodetectors 120 may be a PbSe photodetector, wherein the emitted optical radiation 112 comprises a wavelength of 400 nm to 5000 nm, specifically 800 nm to 4800 nm, more specifically 1200 nm to 4600 nm. However, different kinds of materials or other types of photodetectors 120 may also be feasible.

The spectral measurement device 110 may comprise at least one read-out device 139 configured for measuring the photodetector signals and generating at least one item of spectral data. The read-out device 139 may comprise at least one of a resistance meter, a voltage meter, a current meter, a lock-in amplifier, a voltage divider and an electrical pass filter. The item of spectral data may relate to an absorption of the optical radiation by the measurement object 118. The item of spectral data may comprise at least one absorption spectrum of the measurement object 118, wherein the absorption spectrum may comprise at least one absorption peak. The item of spectral data may be analog and/or digital. The read-out device 139 may be configured for collecting the detector signals, wherein each detector signal may for example be indicative about a detected intensity of the optical radiation within a different spectral range. The read-out device 139 may be configured for processing and/or preprocessing the detector signals. The read-out device may be configured for combining the detector signals in at least one spectrum, specifically in at least one absorption spectrum of the measurement object 118.

At least two of the photodetectors 120 are configured for detecting optical radiation in at least partially different spectral ranges. The spectral ranges are not identical, wherein the spectral ranges may be overlapping or may not be overlapping. At least two of the photodetectors 120 may be different, e.g. comprise pixels comprising different photoconductive materials. Specifically, each active pixel 123 may be configured for detecting optical radiation having at least one spectral characteristic referring to at least one class of the classification model. Each active pixel 123 may be configured for detecting optical radiation having at least one spectral characteristic referring to exactly one class of the classification model. Each class may specifically refer to at least one material having at least one distinct spectral characteristic or to at least one group of materials having similar spectral characteristics. Each spectral characteristic may refer to at least one predetermined and/or predefined spectral range. The spectral characteristic, e.g. an absorption peak of the material, may be located within the predetermined and/or predefined spectral range. The predetermined and/or predefined spectral range may be predetermined and/or predefined before measuring the optical radiation provided by the measurement object, specifically according to a predetermined classification. As an example, the classification based spectral measurement may be supposed to determine materials within a piece of clothing. Before measuring optical radiation provided by the piece of clothing, textile classes may be predetermined and/or predefined, wherein each textile class may comprise a spectral characteristic such as an absorption peak in a different predetermined and/or predefined spectral range. The predetermined and/or predefined spectral range may be at least one spectral range selected from the group consisting of: from 1650 nm to 1700 nm; from 1725 nm to 1800 nm; from 2050 nm to 2150 nm; from 2175 nm to 2225 nm. However, other predetermined and/or predefined spectral ranges are possible for other use cases.

Each pixel is an active pixel 123 or a darkened pixel 124. The substrate may have only one photosensitive area or a dual photosensitive area, with one "active" area and one second "darkened" area by means of mechanical or optical measures. The spectral measurement 110 device comprises at least two active pixels 123. Each active pixel 123 is configured for generating at least one photodetector signal dependent on an illumination of the active pixel 123. At least two of the active pixels 123 are configured for detecting optical radiation in at least partially different spectral ranges. The active pixel 123 may be a pixel which is arranged and/or configured to generate the photodetector signal in response to illumination of its photosensitive area. Active may refer to that the photosensitive area is illuminated in the sensitivity wavelength range during the measurement. The spectral measurement device 110 comprises at least one darkened pixel 124. Each darkened pixel 124 is configured for generating at least one photodetector signal independent on an illumination of the darkened pixel 124. The darkened pixel 124 may be a covered pixel 121. Darkened may refer to that no illumination in the sensitivity wavelength range of the photosensitive area reaches the photosensitive area. The darkened pixel 124 may be covered by a material absorbing in the same wavelength range as the sensitivity range of the photodetector, and/or it may be a piece of metal on top of the photosensitive area reflecting the incident light away from the darkened pixel. The darkened pixel 124 may be covered with a material absorbing the optical radiation such as glue and/or ink. Additionally or alternatively, the darkened pixel may be covered with at least one material reflecting the optical radiation such as a metal. The darkened pixel 124 may specifically see no or at least almost no optical radiation. The darkened pixel 124 may be embodied as extra photodetector 120 with a single pixel, which is covered by above mentioned means, or photodetectors 120 with dual pixels 121 (on one single substrate) wherein one of the pixels 121 is darkened may be used. The darkened pixel 124 may be used for eliminating long-time drifts and temperature effects.

Each photodetector 120 may comprise a maximum of one active pixel 123, wherein the spectral measurement device 110 may comprise at least one darkened pixel 124. For example, each of the photodetectors 120 may comprise two pixels 121, i.e. an active 123 and a darkened pixel 124. For example, one of the photodetectors 120 may comprise a single active pixel 123 and another photodetector 120 may comprise a darkened pixel 124. None of the photodetectors 120 may have more than one active pixel 123. Each active pixel 123 may be configured for detecting a specific spectral range and/or wavelength range. Thus, the respective photodetector 120 may only be responsible for a specific spectral range.

At least one of the photodetectors 120 may comprise at least two pixels 121. At least one of the pixels 121 may be an active pixel 123. At least one of the pixels 121 may be a darkened pixel 124. Specifically, the photodetector 120 may be a dual pixel photodetector. Thus, the photodetector 120 may comprise an active pixel 123 and a darkened pixel 124. The pixels 121 may comprise the same photosensitive material. Thus, a calibration performed by using the darkened pixel 124 may be based on the same photosensitive material the active pixel 123 comprises. All pixels 121 on one photodetector 120 may comprise the same photosensitive material.

The spectral measurement device 110 may comprise at least two radiation sources 116 configured for emitting optical radiation in at least partially different spectral ranges. As an example, the spectral measurement device 110 may comprise two different radiation sources 116, e.g. two different LEDs. Additionally or alternatively, the two radiation sources 116 may comprise different optical filters.

Each photodetector 120 may be configured for detecting optical radiation emitted by a different and exactly one of the radiation sources 116. Each photodetector 120 may be assigned for observing a different spectral range. Each photodetector 120 may be assigned for observing spectral characteristics corresponding to a different class of the classification model. The spectral measurement device 110 may comprise at least three photodetectors 120, specifically at least four photodetectors 120, more specifically at least five photodetectors 120. For example, the spectral measurement device 110 may comprise 16 photodetectors 120 or less. Specifically, the spectral measurement device 110 may comprise at least three pixels 121. More specifically, the spectral measurement device 110 may comprise at least two active pixels 123 and at least one darkened pixel 124. Each active pixel 123 may be comprised by a different photodetector 120. The two active pixels 123 may each be used for observing different spectral ranges. The darkened pixel 124 may be used for calibrating the spectral measurement device 110.

At least one of the photodetectors 120 may be configured for generating at least one reference photodetector signal. Specifically, at least one of the photodetectors 120 may be configured detecting optical radiation reflected from a sample interface and for generating at least one corresponding reference photodetector signal. The exemplary spectral measurement device 110 may comprise an optical element, in particular an optical window 126, preferably, selected from a glass window or a silicon window. A beam splitter may be used. The transparent material as comprised by the optical window 126 may, preferably, be at least partially transparent in at least one partition of a wavelength range as covered by the optical radiation 112. As schematically depicted, the optical element may be configured to guide a first portion 128 of the optical radiation 112 as emitted by the radiation source 116 to at least one of the photodetectors 120. The optical element may, further, be configured to guide a second portion 130 of the optical radiation 112 as emitted by the radiation source 116 to the measurement object 118. The measurement object 118 may be or comprise an arbitrary body, chosen from a living object and a non-living object, which comprises material for investigation or monitoring by the spectral measurement device 110. As a result of this particular assembly of the radiation source 116, the optical element, and the photodetectors 120 within the spectral measurement device 110, the optical element may function as a beam splitting element which is designated for partitioning the optical radiation 112 as emitted by the radiation source 116 into the first portion 128 guided towards the photodetectors 120 in a direct fashion and into the second portion 130 guided towards the at least one photosensitive detectors 120 in an indirect fashion via the measurement object 118.

The optical element may reflect the first portion 128 of the optical radiation 112 to the photodetectors 120 and transmit the second portion 130 to the at least one measurement object 118. However, in an alternative embodiment (not depicted here), the optical element may transmit the first portion 128 of the optical radiation 112 to the photodetector 120 and reflect the second portion 130 to the measurement object 118. Independently of the chosen embodiment, the optical radiation traverses an optically transparent medium 134 on a path from the radiation emitting element 116 to the optical element. Herein, the optically transparent medium 134 may, especially, be selected from ambient air, an inert gas or vacuum, however, a further material as indicated above in more detail may also be feasible.

The spectral measurement device 110 may, further, comprise a spectral transfer element 136 which is configured to select at least one wavelength of the optical radiation 112, either of the first portion 128 and/or of the second portion 130, to illuminate the photodetectors 120. As schematically depicted here, the spectral transfer element 136 may, especially, be an optical filter 138, such as a polarization filter; or bandpass filter, however, a further kind of spectral transfer element 136 may also be feasible. In further embodiments (not depicted here), the spectral transfer element 136 may also be dispensable.

At least one of the photodetectors 120 may comprise the at least one optical filter 138. For example, the optical filter 138 may be an optical bandpass filter. For example, the optical filter 138 may be an optical narrow bandpass (NPB) filter. The spectral range detected by the respective photodetector 120 may be restricted to a spectral range related to at least one class of a classification, e.g. to exactly one class of the classification. The photodetector 120 may be assigned to observing optical properties relating to at least one class of a classification, specifically to exactly one class of the classification. Each photodetector 120 of the spectral measurement device 110 may be assigned for observing a different spectral range. Each photodetector 120 may be assigned for observing spectral characteristics corresponding to a different class of the classification model. The optical filter 138 may be an arbitrary device or object configured for selectively blocking optical radiation according to at least one physical property of the optical radiation such as a wavelength of the optical radiation and/or a polarization of the optical radiation. The optical bandpass filter may be an optical filter which is configured for filtering incident optical radiation in such fashion that only a limited spectral range can pass the optical filter and propagate to objects behind the optical filter. The optical bandpass filter may be configured for only transmitting optical radiation from a minimum wavelength to a maximum wavelength. The spectral measurement device 110 may be designed specific to the respective use-case. The spectral measurement device 110 may be configured for measuring application specific absorption bands. The photodetectors 120 may be configured to the absorption bands and may comprise optical filters 138 such as narrow bandpass (NBP) optical filters with application specific center wavelengths, full width half maximum (FWHM) and out of region blocking level and range. Additionally or alternatively, the photodetectors 120 may be configured to those application specific absorption bands by selecting suitable radiation sources such as LEDs emitting the sample specific wavelengths.

As further schematically depicted in FIG. 1, the spectral measurement device 110 further comprises an evaluation device 140. The evaluation device 140 comprises at least one processor 142 and at least one memory storage 144. The memory storage 144 is configured for storing at least one classification model comprising a set of different classes, wherein each class refers to at least one spectral characteristic, wherein the classification model is configured for classifying at least one item of input data into the classes. The memory storage 144 is configured for storing at least one transfer function configured for transferring the item of spectral data into the item of input data applicable to the classification model. The evaluation device 140 is configured for generating at least one item of measurement information by applying the classification model and the transfer function to the item of spectral data.

The classification model is configured for classifying at least one item of input data into the classes. The classification model may be a model or a scheme which can be used for performing at least one classification. The classification model may comprise predetermined and/or predefined classes such as classes predetermined and/or predefined by a user. The classification model may comprise the class boundaries. The classification model may comprise class properties such as at least one property shared by all entities within one class. The classification model may classify the item of input data into exactly one class. The classification model may classify the item of input data into a plurality of classes.

The classification model may be a global classification model. The global classification model may be hardware independent but application specific classification model. The classification model may be dependent on use-case specific wavelengths, in particular spectral ranges. For every application there is a unique global model. The classification model may be independent of hardware conditions and/or operating conditions. Thus, the classification model may be applicable globally, specifically for different hardware components, e.g. photodetectors, used under different operating conditions, e.g. temperatures.

The classification model may comprise at least one algorithm for analyzing the item of input data and for classifying the item of input data into the classes. The classification model may comprise at least one trained model. The trained model may be trained on at least one training set, specifically by using machine learning. The training data set may comprise historical spectral data, e.g. obtained by at least one external device, specifically at least one further spectral measurement device. The further spectral measurement device may be a laboratory spectral measurement device. The classification model may be generated by using at least one of Random Forest, K-means clustering and a Support Vector Machine (SVM), in particular depending on the application and the accuracy thereafter.

The classification model is configured for classifying at least one item of input data into the classes. The item of input data may be at least one of knowledge or evidence providing a qualitative and/or quantitative description relating to information which are recorded and/or structured in such fashion that they can be interpreted within at least one entity, e.g. a model, a program, a processor or a network, specifically for further processing. Specifically, the item of input data is as said applicable to the classification model. The classification model may be configured for interpreting the item of input data, for processing the item of input data and specifically for classifying the item of input data and/or a processed item of input data. The classification model may specifically be application oriented. As an example, the classification may, as said, refer to a material analyzation of a piece of clothing, wherein the classes may be textile classes such as cotton or wool. In this example, the classification model may be configured for classifying input data in form of processed spectral data referring to the piece of clothing into the textile classes The memory storage 144 is configured for storing the at least one transfer function. The transfer function is configured for transferring the item of spectral data into the item of input data applicable to the classification model. The global classification model may be employed with the help of the transfer function to any similar hardware designed for that particular use-case. Data measured by the spectral measurement device is strongly dependent on the hardware tolerances and ambient conditions such as temperature and humidity. As an example, the read-out device 139 of the spectral measurement device 110 may generate an item of spectral data according to a spectral measurement on a measurement object 118. The item of spectral data may first of all depend on the measurement object 118, e.g. on absorption characteristics of the measurement object 118. However, the item of spectral data may further depend on the spectral measurement device 110 itself, specifically on the hardware of the spectral measurement device 110 such as the used photodetectors. Additionally, the item of spectral data may depend on operating conditions of the spectral measurement device 110 during the spectral measurement, e.g. temperature. The transfer function convert data measured by the spectral measurement device 110 in such a way that the data become applicable to the global classification model offline on any similar device. Similar device may refer to predefined hardware with predefined filters, number of pixels, pixel geometries etc.

The transfer function may be an arbitrary function or algorithm for transferring data. The transfer may comprise at least one conversion of data, specifically adapting data for further processing, more specifically for adapting data for further processing within at least one specific entity such as a specific model. The transfer may comprise transfer of data in such fashion that information comprised by the data is at least partially maintained. Specifically, information which is relevant for further evaluation of the data may be maintained, while a format of the data may be changed. Additionally or alternatively, further information may be added. E.g. for considering the hardware and/or the operating conditions for further evaluation, information on the hardware and/or the operating conditions may be added to the item of spectral data and/or the item of spectral data may be adapted by taking the information on the hardware and/or the operating conditions into account, specifically when generating at least one item of input data applicable to the classification model by using the transfer function. The transfer function may comprise at least one parametrized mathematical function comprising at least one parameter. The transfer function may be a function of coefficients corresponding to the pixels. The transfer function may consider at least one of hardware of the spectral measurement device 110 and operating conditions of the spectral measurement device 110. Specifically, the parameter of the transfer function may be selected to weigh the photodetector signals, more specifically according to at least one of applied geometry of the pixels and applied material for the pixels. As an example, the spectrometer device 110 may comprise at least two pixels 121 with different geometries and/or different active materials. Thus, the two pixels 121 may induce different photodetectors signals for identical incident optical radiation comprising spectral information on one measurement object. By using the transfer function for transferring an item of spectral data into an item of input data applicable to the classification model, the different geometries and/or different active materials may be taken into account when classifying the measurement object 118, e.g. in at least one material class, by using the classification model. The transfer function may allow material classification applications to be localized to hardware and hence mass deployed. The transfer function may for example be derived from a known item of spectral data obtained by using a reference device on a reference sample. The reference device may e.g. comprise a high-end laboratory device. The reference sample may e.g. comprise a known sample such as a known material. Specifically, the transfer function may comprise at least one predetermined coefficient. The parametrized mathematical function may comprise at least one matrix M, e.g. in the form:

$$Y = MX,$$

wherein Y is a vector comprising the item of input data, wherein X is a vector comprising the item of spectral data. Thus, the predetermined coefficient may for example be an element of the matrix M. The parameters of the matrix M may be determined by comparing a measured item of spectral data to a known item of spectral data, e.g. obtained by using a reference device on a reference sample. The matrix M may for example comprise device properties, e.g. detectivity, or temperature compensation parameters or humidity compensation parameters. The transfer function may further comprise at least one look-up table. The look-up table may be configured for matching the item of spectral data to the item of input data applicable to the classification model.

As a particular example, the transfer function may allow for a temperature compensation. Thus, the matrix M may comprise temperature compensation parameters as elements. The temperature compensation parameters may for example be read from a look-up table.

The evaluation device 140 is configured for generating at least one item of measurement information by applying the classification model and the transfer function to the item of spectral data. The item of measurement information may be knowledge or evidence providing a qualitative and/or quantitative description relating to at least one measurement, specifically to at least one measurement object. The item of measurement information may comprise at least one of a physical property of the measurement object and a chemical property of the measurement object 118, specifically a chemical composition of the measurement object 118. The physical property may specifically comprise an optical property such at least one absorptivity of the measurement object 118 and/or at least one emissivity of the measurement object 118. The chemical composition may specifically refer to qualitative and/or quantitative information on at least one material the measurement object 118 comprises. The evaluation device 140 may be configured for performing a classification of the measurement object 118 based on the item of measurement information. The item of measurement information and thus the measurement object 118 may be assigned to one or more classes, e.g. classes predetermined by a user. Additionally or alternatively, the item of measurement information may be used for generating and/or defining at least one class, e.g. a new material class.

The transfer function may be updated, in particular recalibrated, by a user of the spectral measurement device 110 or automatically by the spectral measurement device 110. For example, the evaluation device may further be configured for adapting the transfer function such as when a calibration measurement is performed. Specifically, the evaluation device 140 may be configured for updating the transfer function accordingly when a change in hardware conditions and/or operation conditions is detected in the calibration measurement. As an example, the calibration measurement may reveal a change in a responsivity of at least one photodetector 120, e.g. due to a degradation of at least one pixel 121. Then, a weighting of the pixel 121 may be adapted in the transfer function, specifically by adapting a corresponding parameter of the transfer function. The spectral measurement device 110 may be equipped with measures for automatic self-calibration, e.g. as described in EP application No. 20211174.6 filed on Dec. 2, 2020 and as described with respect to the optical window 126 of the embodiment of FIG. 1. Additionally or alternatively, instead of using a Fresnel reflection of window materials of optical window 126, the spectral measurement device 110 may be equipped with integrated diffuse reflection targets, which may be used as calibration target, if no sample is present. The spectral measurement device 110 may be configured for performing at least one calibration measurement. Specifically, the calibration measurement may be performed once a change in operating and ambient conditions of the classification based spectral measurement exceeds a predefined limit.

For example, the evaluation device 140 may be configured to perform a calibration of the spectral measurement device 110 by using a first detector signal as generated by one of the photodetectors 120 upon the illumination by the first portion 128 of the optical radiation 112, which is guided to one of the photodetectors 120 via the optical window 126 in a direct fashion. The evaluation device 140 is, additionally, configured here to determine spectral information related to the measurement object 118 by using a second detector signal as further generated by one of the photodetectors 120 upon the illumination by the second portion 130 of the optical radiation 112, which has been reflected by the measurement object 118 and/or transmitted through the measurement object 118 towards the photodetector 120.

The evaluation device 140 may be configured for receiving the first detector signal and, preferably, the second detector signal via an interface 146, specifically in a wire-bound or a wireless fashion. Generally, the evaluation device 140 may be part of a data processing device and/or may comprise one or more data processing devices. The evaluation device 140 may comprise one or more additional components, in particular one or more electronic hardware components and/or one or more software components and/or one or more controlling units. As illustrated here, the evaluation device 140 can, in addition, be designed to, completely or partially, control or drive the spectral measurement device 110, or a component thereof, in particular, the photodetectors 120, especially via the interface 146, and/or the radiation source 116, especially via a further interface 146.

In the exemplary embodiments as depicted in FIG. 1, the evaluation device 140 is fully integrated into the housing 114; however, an external evaluation unit (not depicted here) which may be provided as a separate entity located outside the housing 114, such as part of an electronic communication unit, specifically a smartphone or a tablet, may also be feasible. The information which is determined by the evaluation device 140 can be provided to one or more further apparatus or users in an electronic, visual, acoustic and/or tactile fashion. By way of example, the information can be displayed using a monitor of the smartphone. Further, the information may be stored in a data storage unit (not depicted here), which may be comprised by the evaluation device 140, or by a separate storage device, such as the smartphone.

The evaluation device 140 may be configured for automatically recalibrating the spectral measurement device 110 by using at least one photodetector signal generated by using the darkened pixel 124, specifically for continuously or repeatedly recalibrating the spectral measurement device 110, e.g. in parallel to performing a classification based spectral measurement. A photodetector signal generated by using a darkened pixel 124 may be independent of the optical radiation reaching the spectral measurement device. In other words, even though the optical radiation reaching the spectral measurement device 110 may change, the photodetector signal generated by using a darkened pixel 123 may stay constant. The photodetector signal generated by using a darkened pixel 124 may be suited for correcting drifts, specifically long-time drifts, of the photodetectors 120. The photodetector signal generated by using a darkened pixel may temperature dependent. As an example, the darkened pixel 124 may comprise at least on semiconducting material, in which a spontaneous formation of free charge carries may be thermally induced. Thus, the photodetector signal generated by using a darkened pixel may further be suited for correcting temperature effects on the photodetectors 120. The calibrating may comprise correcting drifting effects which may occur in measurements in practice, primarily due to alterations related to hardware components and/or due to alterations having an effect onto the hardware components, specifically the spectral measurement device or parts thereof. The alterations may specifically comprise at least one of: a degradation of at least one of the radiation source 116 or the photodetectors 120, specifically a pixel 121; a temperature drift of at least one of the radiation source 116 or the photodetectors 120; a variation of an ambient temperature affecting the spectral measurement device 110; a variation of a temperature related to the spectral measurement device 110, i.e. the temperature at which the photodetectors 120 and/or corresponding electronics may operate; a mechanical extension or contraction of at least one component as comprised by the spectral measurement device 110, specifically of at least one of a mechanical housing, a holder and an optical element. Further alterations may also be feasible. Electrochemical processes or physical processes such as a relaxation of long lifespan traps may induce the drifting effects. Correcting the drifting effects may particularly facilitate maintaining a reliability of the item of measurement information, specifically by avoiding that the drifting effects may distort the item of measurement information to such an extent that results as determined by the spectral measurement device 110 may become inconclusive. Thus, regular calibration of the used hardware may typically be required in order to maintain reliability of the spectral measurement device. Automatically calibrating the spectral measurement device by using at least one photodetector signal generated by using the darkened pixel may be particularly consumer friendly. The photodetector signal generated by using a darkened pixel may be suited for correcting drifts, specifically long-time drifts, of the photodetectors, and further for correcting temperature effects on the photodetectors 120.

Figure 2A:
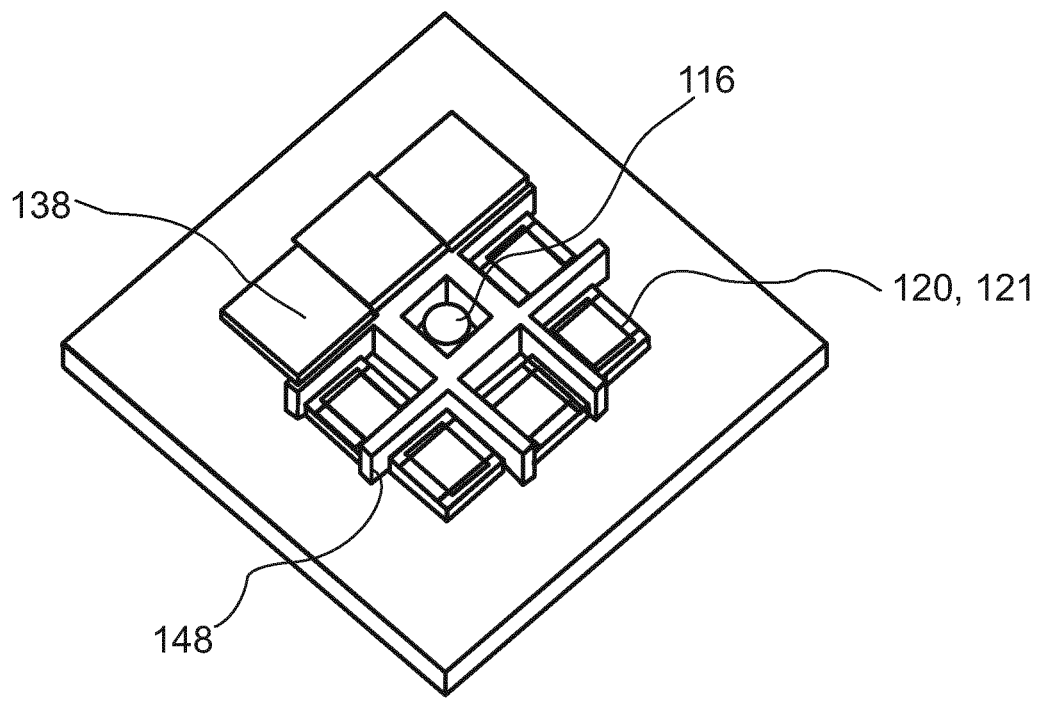
FIGS. 2A and 2B show arrangements of multiple single pixels with wavelength dependent optical filters with a single radiation source.
Figure 2B:
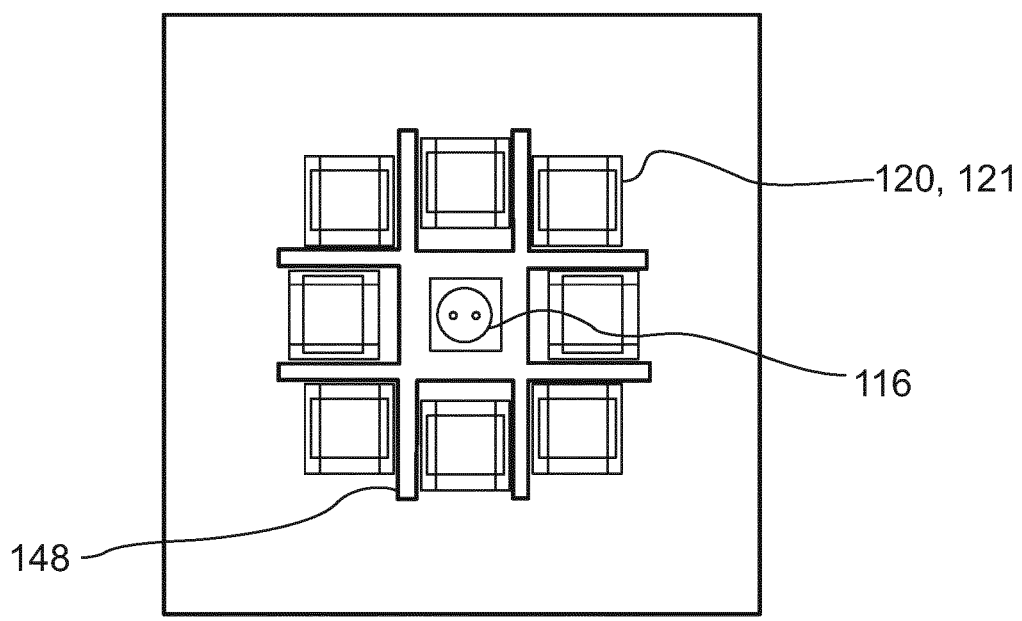

FIGS. 2A and 2B show arrangements of multiple single pixels 121 with wavelength dependent optical filters 138 with a single radiation source 116. In FIG. 2A, in a perspective view, eight photodetectors 120 each having a single pixel 121 are shown in a circular arrangement around one single radiation source 116. Exemplarily three optical filters 138 configured to transmit particular wavelengths onto the photodetector 120 are shown in FIG. 2A. The photodetectors 120 may be isolated from each other in such a way that the crosstalk between the individual detectors 120 and stray light is suppressed. In FIGS. 2A and 2B blocking walls 148 made of IR absorbing material are arranged between the photodetectors 120. This may be possible since the photodetectors 120 are physically separated on individual substrates. Thus, the radiation at designated wavelengths can be detected much more precisely and without crosstalk. In FIG. 2B, in top view, the circular arrangement of the photodetectors 120 is shown without the optical filters 138.

Figure 3A:
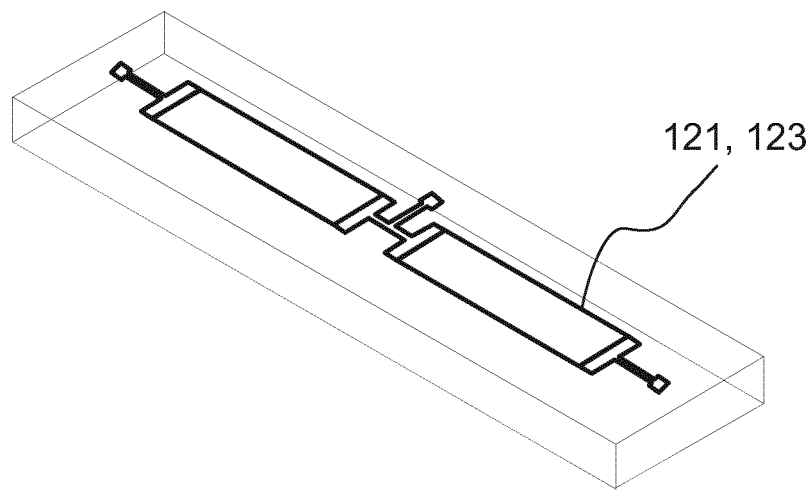
FIGS. 3A and 3B show embodiments where every single pixel is a twin.
Figure 3B:
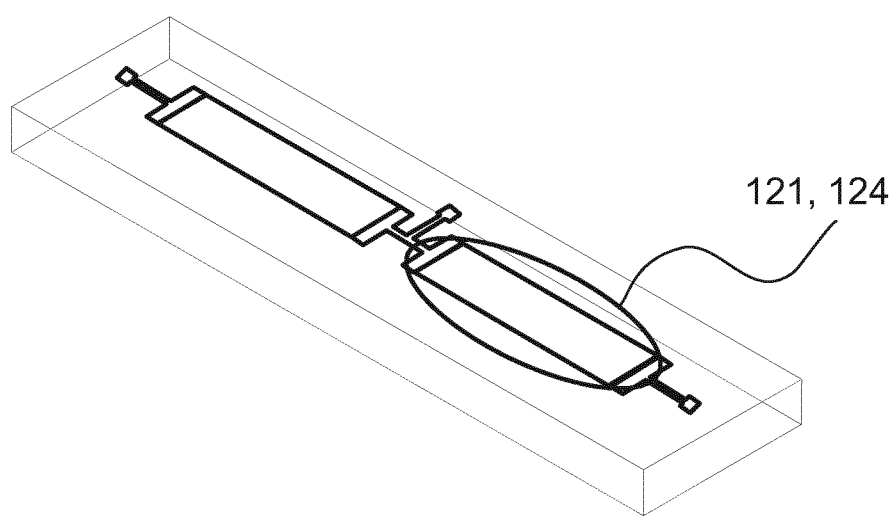

FIGS. 3A and 3B show embodiments where every single pixel is a twin that is configured for the specific wavelength and its twin is darkened. In FIG. 3A one active twin pixel 121 is shown and in FIG. 3B a twin with a darkened pixel 124 is shown.

Figure 5A:
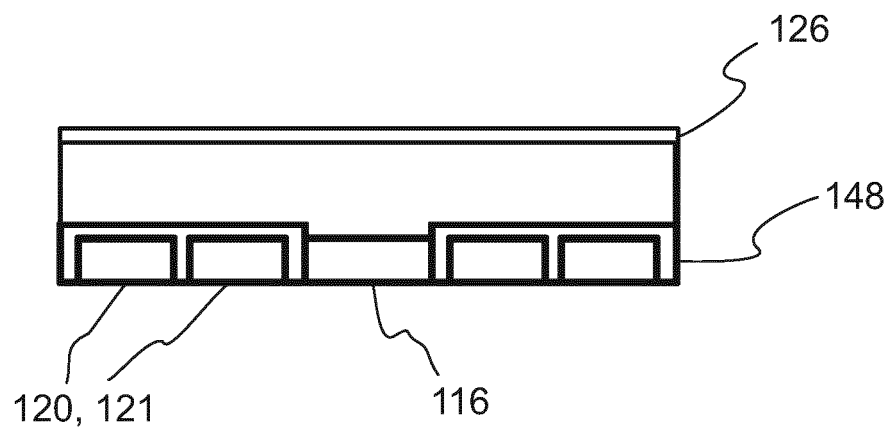
FIGS. 5A and 5B show an assembly with radiation source aligned in the center and an assembly with multiple radiation sources aligned around the periphery.
Figure 5B:
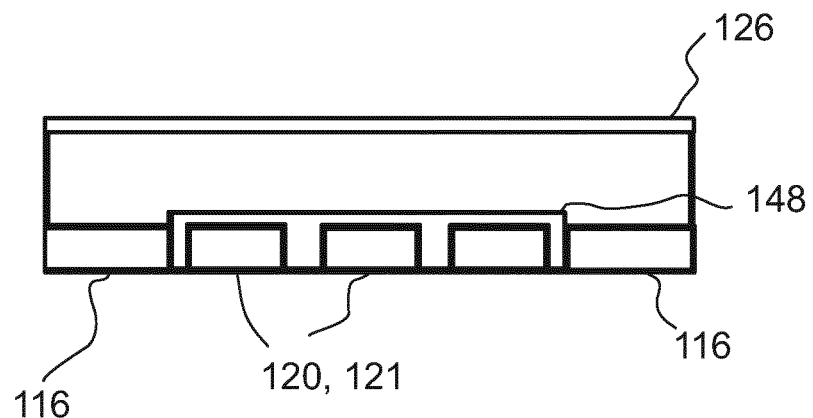

FIGS. 5A and 5B show further assemblies of the photodetectors 120 with the radiation source 116. In FIG. 5A the radiation source 116 is aligned in the center. In FIG. 5B the multiple radiation sources 116 may be used aligned around the periphery. In both Figures blocking walls 148 are shown. In addition, the optical window 126 is shown.

Figure 4A:
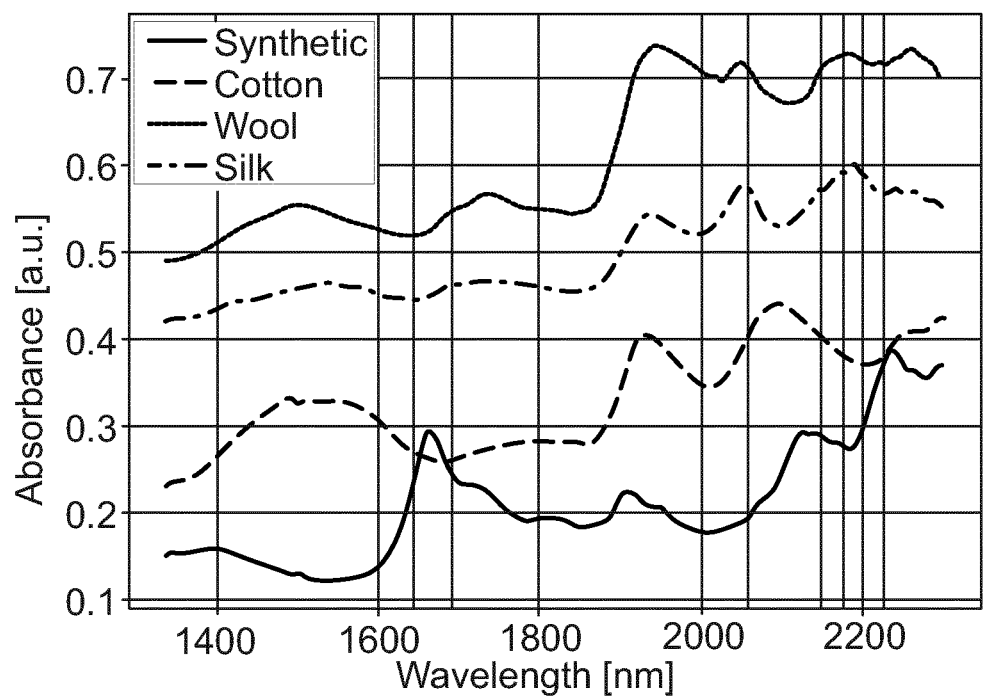
FIG. 4 shows material specific absorption bands for different textile classes.

As outlined above, the spectral measurement device 110 may be designed specific to the respective use-case. For example, a textile use-case may require e.g. the differentiation between different textiles into classes such as Cotton, Wool, Silk and Synthetic. Every textile has a certain characteristic infrared absorption spectrum. The literatures have already shown that there are certain absorption bands specific to certain material. For example, Cotton absorbs around 2100 nm, Wool around 1724 nm, synthetics around 1662 nm, etc. FIG. 4 shows material specific absorption bands for different textile classes. Thus, for this textile use-case, it may be sufficient to measure these four material specific absorption bands by configuring the detector pixels to these sample specific wavelengths, instead of measuring whole spectrum with an expensive spectrometer, since only specific wavelength components carry the information about the textile classes. Four photodetectors 120, e.g. photodetectors 1 to 4, may be used. The photodetectors 120 may be configured to the wavelengths with the help of narrow bandpass (NBP) optical filters 138 with center wavelengths and Full width half maximum (FWHM) as mentioned in table below:

|  | Center wavelength [nm] | FWHM [nm] |
|---|---|---|
| Photodetector 1 - NBP filter 1 | 1660 | 20 |
| Photodetector 2 - NBP filter 2 | 1724 | 10 |
| Photodetector 3 - NBP filter 3 | 2100 | 50 |
| Photodetector 4 - NBP filter 4 | 2378 | 20 |

For example, a further use-case may require plastics classification, e.g. where PET is supposed to be classified from other plastic types such as PP, PE, etc. In this embodiment, 2 or 3 pixels may be used which are specific to those plastic classes.

Figure 6:
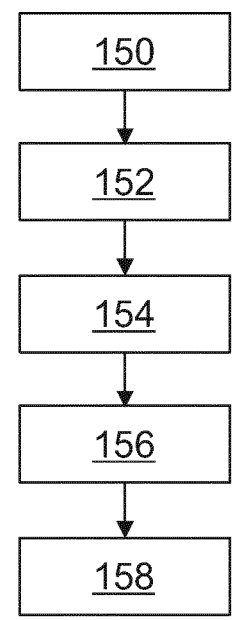
FIG. 6 illustrates a schematic view of an exemplary embodiment of a method for measuring optical radiation according to the present invention.

FIG. 6 illustrates a schematic view of an exemplary embodiment of a method for measuring optical radiation 112 according to the present invention. The method comprises the following steps:
a) (reference number 150) emitting optical radiation 112 at least partially towards the measurement object 118 by using the at least one radiation source 116, wherein the optical radiation 112 is at least partially in the spectral range of interest for the classification based spectral measurement;
b) (reference number 152) detecting the optical radiation 112 provided by the measurement object 118 and generating at least one photodetector signal by using the at least two photodetectors 120;
c) (reference number 154) measuring the photodetector signal and generating at least one item of spectral data by using the at least one read-out device 139;
d) (reference number 156) transferring the item of spectral data into at least one item of input data applicable to the classification model by using the transfer function; and
e) (reference number 158) generating at least one item of measurement information by using the classification model.

The method may further comprise the following steps (not shown here):
f) performing at least one calibration measurement once the change in operating conditions and/or ambient conditions of the classification based spectral measurement exceeds a predefined limit; and
g) adapting the transfer function corresponding to the calibration measurement.

LIST OF REFERENCE NUMBERS 110 spectral measurement device
112 optical radiation
114 housing
116 radiation source
118 measurement object
120 photodetector
121 pixel
123 active pixel
124 darkened pixel
126 optical window
128 first portion
130 second portion
134 optically transparent medium
136 spectral transfer element
138 optical filter
139 read-out device
140 evaluation device
142 processor
144 memory storage
146 interface
148 blocking wall
150 method step a)
152 method step b)
154 method step c)
156 method step d)
158 method step e)

The invention claimed is:

1. A spectral measurement device for measuring optical radiation provided by at least one measurement object in at least one classification based spectral measurement, the spectral measurement device comprising:
at least one radiation source configured for emitting optical radiation at least partially towards the measurement object, wherein the optical radiation is at least partially in the spectral range of interest for the classification based spectral measurement;

at least two photodetectors, wherein each photodetector comprises at least one pixel, wherein each pixel is an active pixel or a darkened pixel, wherein the spectral measurement device comprises at least two active pixels, wherein the spectral measurement device comprises at least one darkened pixel, wherein each active pixel is configured for generating at least one photodetector signal dependent on an illumination of the active pixel, wherein at least two of the active pixels are configured for detecting optical radiation in at least partially different spectral ranges, wherein each darkened pixel is configured for generating at least one photodetector signal independent on an illumination of the darkened pixel;

at least one read-out device configured for measuring the photodetector signals and generating at least one item of spectral data; and at least one evaluation device comprising at least one processor and at least one memory storage, wherein the memory storage is configured for storing at least one classification model comprising a set of different classes, wherein each class refers to at least one spectral characteristic, wherein the classification model is configured for classifying at least one item of input data into the classes; and at least one transfer function configured for transferring the item of spectral data into the item of input data applicable to the classification model;

wherein the evaluation device is configured for generating at least one item of measurement information by applying the classification model and the transfer function to the item of spectral data.

2. The spectral measurement device according to claim 1, wherein each photodetector comprises a maximum of one active pixel, wherein the spectral measurement device comprises at least one darkened pixel, wherein the evaluation device is configured for automatically recalibrating the spectral measurement device by using at least one photodetector signal generated by using the darkened pixel.

3. The spectral measurement device according to claim 1, wherein each active pixel is configured for detecting optical radiation having at least one spectral characteristic referring to at least one class of the classification model.

4. The spectral measurement device according to claim 1, wherein each class refers to at least one material having at least one distinct spectral characteristic or to at least one group of materials having similar spectral characteristics.

5. The spectral measurement device according claim 1, wherein each spectral characteristic refers to at least one predetermined and/or predefined spectral range.

6. The spectral measurement device according claim 1, wherein the classification model is based on at least one algorithm being trained on historical spectral data obtained by at least one external device, specifically at least one further spectral measurement device.

7. The spectral measurement device according to claim 1, wherein the transfer function comprises at least one parametrized mathematical function comprising at least one parameter, wherein the transfer function considers at least one of hardware of the spectral measurement device and operating conditions of the spectral measurement device.

8. The spectral measurement device according to claim 1, wherein the item of measurement information comprises at least one of a physical property of the measurement object and a chemical property of the measurement object.

9. The spectral measurement device according to claim 1, wherein the evaluation device is configured for performing a classification of the measurement object based on the item of measurement information.

10. The spectral measurement device according to claim 1, wherein the spectral measurement device is configured for performing at least one calibration measurement, wherein the evaluation device is further configured for adapting the transfer function when a calibration measurement is performed.

11. The spectral measurement device according to claim 1, wherein at least one of the photodetectors comprises at least one photoconductive material, wherein the photoconductive material is selected from the group consisting of PbS, PbSe, Ge, InGaAs, InSb, HgCdTe, and combinations thereof.

12. The spectral measurement device according to claim 1, wherein the spectral measurement device comprises at least one communication interface configured for transmitting data from and/or to the evaluation device.

13. The spectral measurement device according to claim 1, wherein the spectral measurement device comprises at least one sample interface configured for at least partially directing the optical radiation emitted by the radiation source towards the photodetectors with a predefined spectrum.

14. A method for measuring optical radiation provided by at least one measurement object by performing a classification based spectral measurement by using the spectral measurement device according to claim 1, the method comprising:

a) emitting optical radiation at least partially towards the measurement object by using the at least one radiation source, wherein the optical radiation is at least partially in the spectral range of interest for the classification based spectral measurement;

b) detecting the optical radiation provided by the measurement object and generating at least one photodetector signal by using the at least two photodetectors;

c) measuring the photodetector signal and generating at least one item of spectral data by using the at least one read-out device;

d) transferring the item of spectral data into at least one item of input data applicable to the classification model by using the transfer function; and e) generating at least one item of measurement information by using the classification model.

15. A computer program comprising instructions which, when the program is executed by a spectral measurement device cause the spectral measurement device to perform the method according to claim 14.

16. A method of using the spectral measurement device according to claim 1, the method comprising using the spectral measurement device for a purpose of use selected from the group consisting of an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application;

an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, ; a plastics identification; a textiles identification and a recycling application.

17. The spectral measurement device according to claim 1, wherein the item of measurement information comprises at least one of a physical property of the measurement object and a chemical composition of the measurement object.

18. The spectral measurement device according to claim 1, wherein the spectral measurement device comprises at least one communication interface configured for adapting the classification model and/or the transfer function.

* * * * *